(12) United States Patent
Choi

(10) Patent No.: US 11,747,874 B2
(45) Date of Patent: Sep. 5, 2023

(54) METHOD FOR IMPLEMENTING POWER AND/OR HEAT GENERATION CONTROL AND ELECTRONIC DEVICE THEREFOR

(71) Applicant: Samsung Electronics Co., Ltd., Gyeonggi-do (KR)

(72) Inventor: Seungchul Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/691,832

(22) Filed: Mar. 10, 2022

(65) Prior Publication Data

US 2022/0197355 A1    Jun. 23, 2022

Related U.S. Application Data

(63) Continuation of application No. PCT/KR2020/011494, filed on Aug. 27, 2020.

(30) Foreign Application Priority Data

Sep. 10, 2019  (KR) .................. 10-2019-0112252
May 26, 2020  (KR) .................. 10-2020-0063190

(51) Int. Cl.
*G06F 1/20*  (2006.01)
*G06F 11/30* (2006.01)
*H04W 28/02* (2009.01)

(52) U.S. Cl.
CPC .......... *G06F 1/206* (2013.01); *G06F 11/3058* (2013.01); *H04W 28/0221* (2013.01)

(58) Field of Classification Search
CPC ....................................................... G06F 1/206
See application file for complete search history.

(56) References Cited

U.S. PATENT DOCUMENTS

| 9,618,994 | B2 * | 4/2017 | Tal .................. G06F 1/3206 |
| 9,774,633 | B2 * | 9/2017 | Knappe ............... H04L 63/0236 |
| 10,409,544 | B2 | 9/2019 | Park et al. |
| 10,917,786 | B2 | 2/2021 | Ryoo et al. |
| 10,952,145 | B2 | 3/2021 | Kweon et al. |

(Continued)

FOREIGN PATENT DOCUMENTS

| KR | 10-2019-0001094 | 1/2019 |
| KR | 10-2019-0060259 | 6/2019 |

(Continued)

*Primary Examiner* — Suresh Suryawanshi
(74) *Attorney, Agent, or Firm* — The Farrell Law Firm, P.C.

(57) ABSTRACT

A method and an electronic device are provided for implementing power and heat generation control by efficiently using a resource. The electronic device includes a communication module supporting a first communication scheme and a second communication scheme; a temperature sensor; and a processor configured to execute an application by using the first communication scheme, measure a temperature value by using the temperature sensor, identify a policy related to the executed application when the measured temperature value is higher than a preconfigured temperature value, determine whether the identified policy satisfies a quality of service (QoS) required by the application, and execute the identified policy upon determining that the identified policy satisfies the QoS required by the application. The policy uses the second communication scheme.

20 Claims, 11 Drawing Sheets

(56) References Cited

U.S. PATENT DOCUMENTS

| | | |
|---|---|---|
| 11,019,548 B2 | 5/2021 | Kim et al. |
| 2011/0230211 A1 | 9/2011 | Kim et al. |
| 2012/0179416 A1 | 7/2012 | Anderson et al. |
| 2016/0378150 A1* | 12/2016 | Sega ................... G06F 11/3017 700/299 |
| 2019/0020590 A1* | 1/2019 | Faccin ................... H04L 47/20 |
| 2020/0036643 A1 | 1/2020 | Jang et al. |
| 2021/0165442 A1* | 6/2021 | Jung ..................... G06F 1/3215 |

FOREIGN PATENT DOCUMENTS

| | | | | |
|---|---|---|---|---|
| WO | WO-2013043351 A1 * | 3/2013 | ............. | H04B 1/005 |
| WO | WO-2019108011 A1 * | 6/2019 | ........... | G06F 1/3203 |

\* cited by examiner

FIG. 10
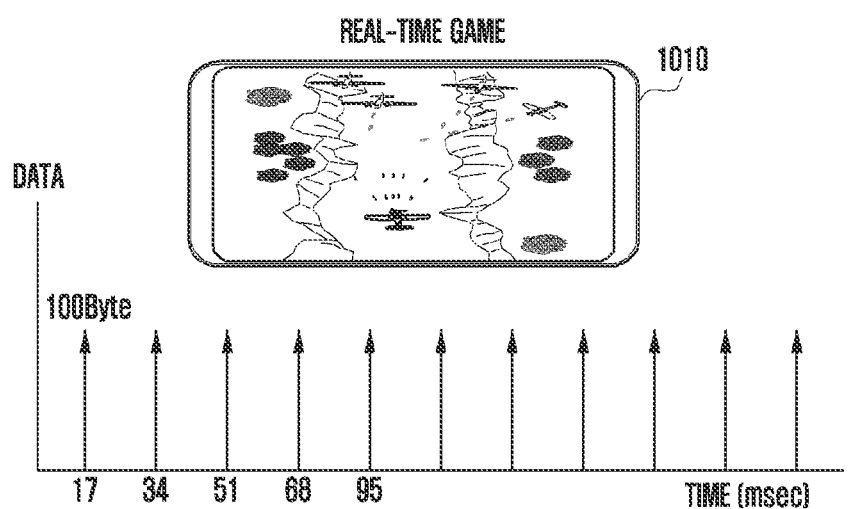
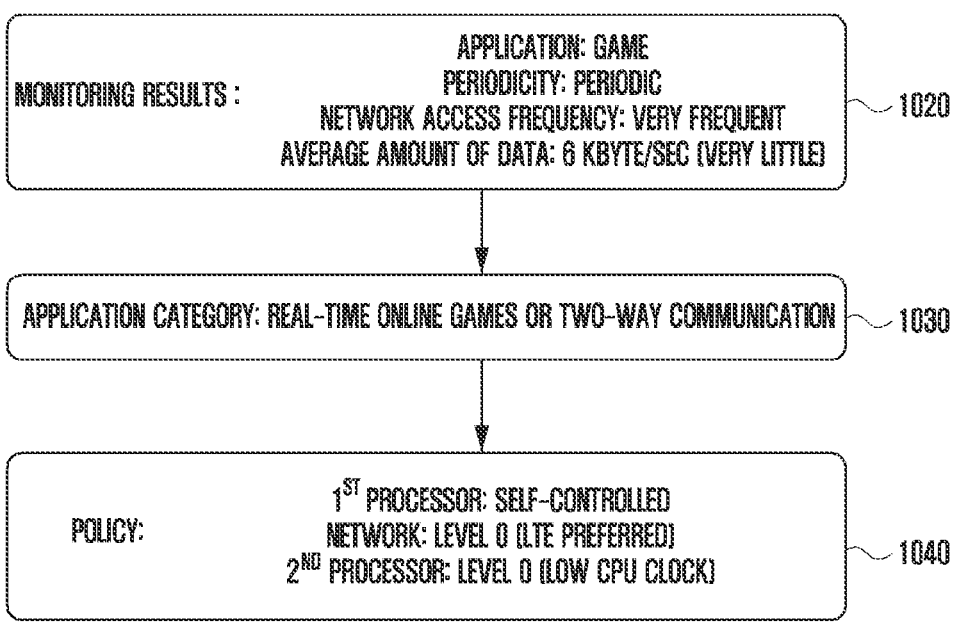

METHOD FOR IMPLEMENTING POWER AND/OR HEAT GENERATION CONTROL AND ELECTRONIC DEVICE THEREFOR

CROSS-REFERENCE TO RELATED APPLICATIONS

This application is a Bypass Continuation Application of International Application No. PCT/KR2020/011494, which was filed on Aug. 27, 2020, and is based on and claims priority under 35 U.S.C. § 119 to Korean Patent Application Nos. 10-2019-0112252 and 10-2020-0063190, which were filed in the Korean Intellectual Property Office filed on Sep. 10, 2019, and May 26, 2020, respectively, the entire disclosure of each of which is incorporated herein by reference.

BACKGROUND

1. Field

The disclosure relates generally to a method for efficiently implementing power and/or heat generation control and an electronic device therefor.

2. Description of Related Art

Various electronic devices, such as smart phones, tablet personal computers (PCs), portable multimedia players (PMPs), personal digital assistants (PDAs), laptop PCs, and wearable devices have been popularized. Further, an electronic device having a foldable property (e.g., a foldable device) has been introduced through the utilization of a flexible display having a bendable property.

With the development of such technologies, different types of electronic devices are also being developed, and the performance required for these electronic devices is also increasing. As electronic devices operate in accordance with the required increasing performance, the amounts of heat generation and power consumption are also increasing.

More specifically, as communication technology develops, the complexity of an electronic device for providing a large amount of data transfer (i.e., high throughput) and/or a low transmission delay (i.e., low latency) is increasing. Thus, the current consumption of the electronic device may increase when data is transmitted/received through an on-the-air (OTA) network.

SUMMARY

The disclosure is provided to address at least the above-mentioned problems and/or disadvantages and to provide at least the advantages described below.

An aspect of the disclosure is to provide an electronic device and an operating method thereof to reduce current consumption, reduce the complexity of the electronic device providing high throughput and/or low latency, and/or minimize heat generation of the electronic device.

In accordance with an aspect of the disclosure, an electronic device is provided, which includes a communication module supporting a first communication scheme and a second communication scheme, a temperature sensor, and a processor configured to execute an application by using the first communication scheme, to measure a temperature value by using the temperature sensor, to identify a policy related to the executed application when the measured temperature value is higher than a preconfigured temperature value, to determine whether the identified policy satisfies a quality of service (QoS) required by the application, and to execute the identified policy upon determining that the identified policy satisfies the QoS required by the application. The policy uses the second communication scheme.

In accordance with another aspect of the disclosure, a method of an electronic device is provided, which includes executing an application by using a first communication scheme, measuring a temperature value by using a temperature sensor, identifying a policy related to the executed application when the measured temperature value is higher than a preconfigured temperature value, determining whether the identified policy satisfies a quality of service (QoS) required by the application, and executing the identified policy upon determining that the identified policy satisfies the QoS required by the application. The policy uses the second communication scheme.

In accordance with another aspect of the disclosure, an electronic device is provided, which includes a communication module supporting a first communication scheme and a second communication scheme, a temperature sensor, and a processor configured to execute an application, to perform communication with an external electronic device through the communication module by using the first communication scheme while the application is executed, to measure a temperature value of the electronic device by using the temperature sensor while the communication is performed, to identify a specified requirement related to the executed application, and to perform communication with the external electronic device by using the second communication scheme when the specified requirement belongs to a first policy and when the temperature value of the electronic device is higher than a preconfigured temperature value. A first communication delay time of the first communication scheme may be smaller than a second communication delay time of the second communication scheme.

BRIEF DESCRIPTION OF DRAWINGS

The above and other aspects, features, and advantages of certain embodiments of the disclosure will be more apparent from the following description taken in conjunction with the accompanying drawings, in which:

FIG. 10 illustrates a policy based on the execution of an application according to an embodiment.

DETAILED DESCRIPTION

Hereinafter, various embodiments of the disclosure will be described with reference to the accompanying drawings. Descriptions of well-known functions and constructions are omitted for the sake of clarity and conciseness.

Figure 1:
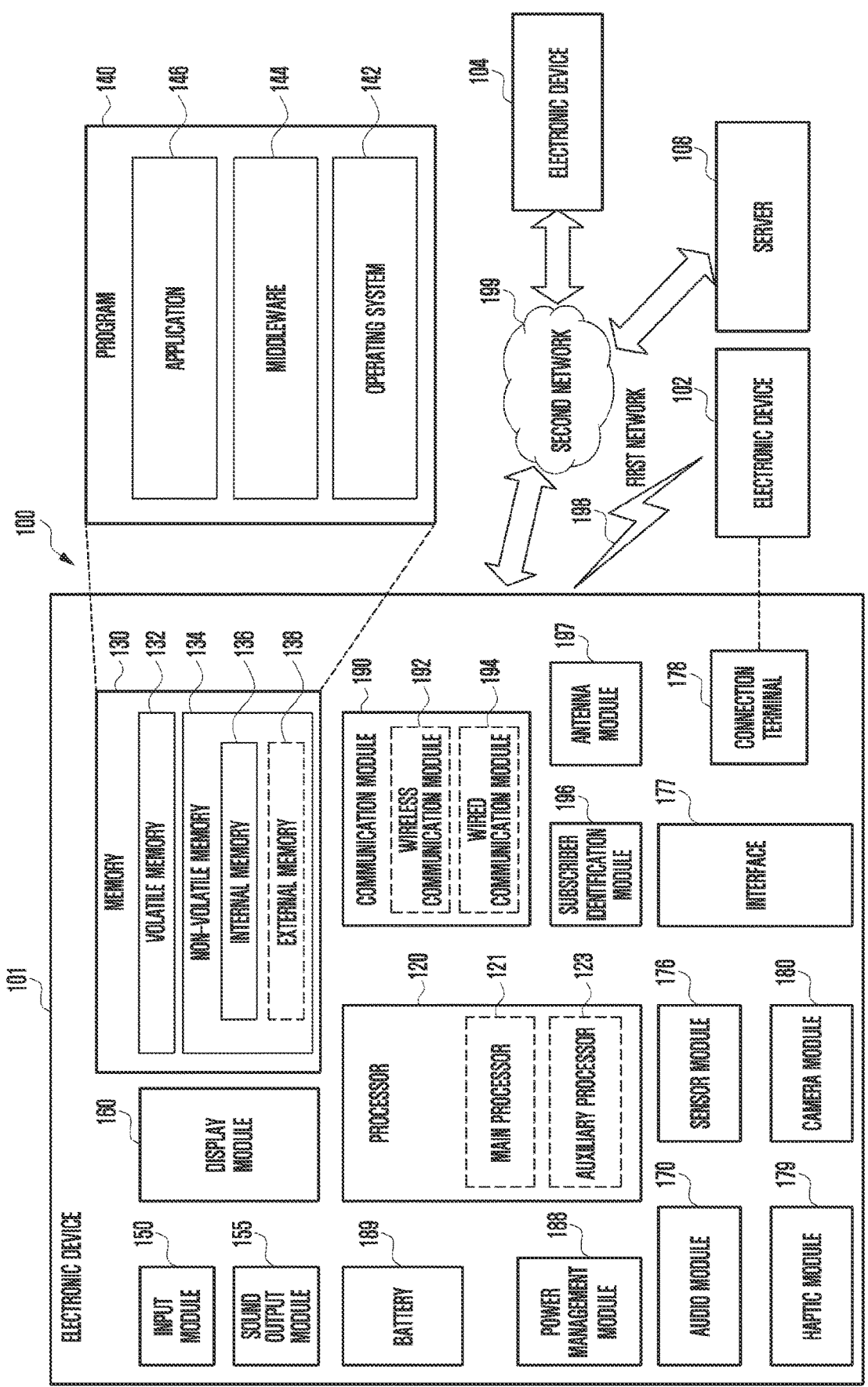
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be integrated into one component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specialized for processing an artificial intelligence model. The artificial intelligence model can be created through machine learning. Such learning may be performed, for example, in the electronic device 101 itself on which artificial intelligence is performed, or may be performed through a separate server (e.g., the server 108). A learning algorithm may include, for example, but is not limited to, supervised learning, unsupervised learning, semi-supervised learning, or reinforcement learning. The artificial intelligence model may include a plurality of artificial neural network layers. The artificial neural network may be one of, but is not limited to, a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or any combination thereof. Additionally or alternatively, the artificial intelligence model may include a software structure in addition to a hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (WiFi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a $5^{th}$ generation (5G) network after a $4^{th}$ generation (4G) network and a next-generation communication technology, for example, a new radio (NR) access technology. The NR access technology may support a high-speed transmission of high-capacity data (enhanced mobile broadband (eMBB)), electronic device power minimization and multiple electronic device access (massive machine type communications (mMTC)), or high reliability and low latency (ultra-reliable and low-latency communications (URLLC)). In order to achieve a high data rate, for example, the wireless communication module 192 may support a high frequency band (e.g., mmWave band). The wireless communication module 192 may support various technologies for ensuring performance in the high frequency band, for example, such as beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for realization of eMBB, a loss coverage (e.g., 164 dB or less) for realization of mMTC, or a user plane (U-plane) latency (e.g., 0.5 ms or less for each of downlink (DL) and uplink (UL), or 1 ms for round trip) for realization of URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may include a mmWave antenna module. According to an embodiment, the mmWave antenna module may include a PCB, an RFIC disposed on or adjacent to a first surface (e.g., a lower surface) of the PCB and capable of supporting a designated high frequency band (e.g., mmWave band), and a plurality of antennas (e.g., an array antenna) disposed on or adjacent to a second surface (e.g., an upper or side surface) of the PCB and capable of transmitting or receiving a signal of the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low latency service by using, for example, distributed computing or mobile edge computing. In another embodiment, the external electronic device 104 may include an Internet of things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or health care) based on 5G communication technology and IoT-related technology.

The electronic device 101 according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. However, the electronic device 101 is not limited to those described above.

In the disclosure, various kinds of information related to the electronic device 101 are included. According to various embodiments, network-related information may be information related to a network type or frequency band used by the electronic device 101. According to various embodiments, capability information (or information about performance) of the electronic device 101 may be information about a network or components supported by the electronic device 101. For example, the capability information of the electronic device 101 may include information indicating whether the electronic device 101 supports WiFi, and a clock frequency of a processor 120 of the electronic device 101. According to various embodiments, status information may be information about the status of a component included in the electronic device 101. For example, the status information may include information indicating whether the antenna module 197 is in use, the clock frequency of the processor 120 of the electronic device 101, etc. According to various embodiments, monitoring information may refer to information monitored by the processor 120 of the electronic device. For example, the monitoring information may include the amount of data transfer, a frequency band used, and a temperature value measured using a temperature sensor. According to various embodiments, various kinds of information disclosed herein are not mutually exclusive, but may be interchanged as needed. For example, the clock frequency of the processor 120 of the electronic device may be capability information and status information of the electronic device.

Figure 2:
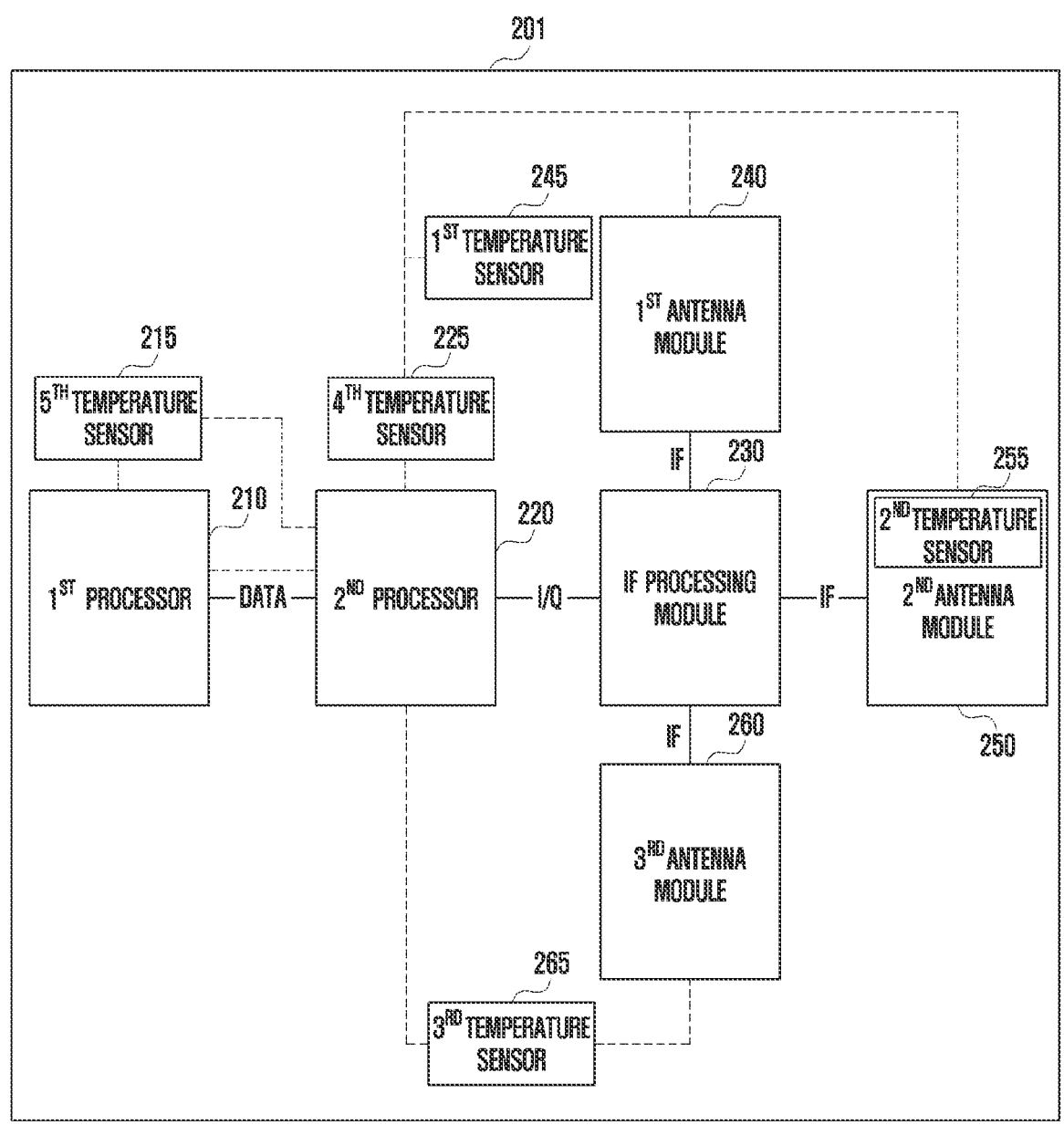
FIG. 2 illustrates a processor, a part of a communication module, and a part of an antenna module of an electronic device including at least one sensor module according to an embodiment.

FIG. 2 illustrates a processor, a part of a communication module, and a part of an antenna module of an electronic device including at least one sensor module according to an embodiment.

Referring to FIG. 2, an electronic device 201 includes a sensor module (e.g., a temperature sensor). More specifically, the electronic device 201 includes a first processor 210, a second processor 220, first to fifth temperature sensors 245, 255, 265, 225, and 215, first to third antenna modules 240, 250, and 260, and an intermediate frequency (IF) processing module 230.

The IF processing module 230 may transmit and receive an IF signal to and from each antenna module 240, 250, or 260. The IF processing module 230 may receive in-phase/quadrature phase (I/Q) data from the second processor 220, convert it into an IF signal, and transmit the IF signal to an antenna module suitable for a frequency band to be transmitted. The IF processing module 230 may convert an IF signal received from each antenna module into I/Q data adapted to be processed by the second processor 220, and transmit the I/Q data to the second processor 220.

The antenna modules 240, 250, and 260 may have different frequency bands that can be processed. For example, the first antenna module 240 and the second antenna module 250 may be capable of processing 3.3 to 4.2 GHz and 4.4 to 5.0 GHz, respectively, in a frequency band of 6 GHz or less, and the third antenna module 260 may be capable of processing 27.5 to 28.35 GHz in a frequency band of 26 GHz or more. Although three antenna modules are illustrated in FIG. 2, the number of antenna modules vary.

The second processor 220 may transmit/receive data (e.g., a message) to/from the first processor 210. For example, when the first processor 210 transmits a message to the second processor 220, the second processor 220 may determine a transmission frequency, convert the message into I/Q data, and transmit it to the IF processing module 230.

The second processor 220 may control the sensor modules 245, 255, 265, 225, and 215 and/or the antenna modules 240, 250, and 260. The second processor 220 may transmit/receive a control signal to/from the first processor 210 in addition to data. The sensor modules 245, 255, 265, 225, and 215 and/or the antenna modules 240, 250, and 260 may also be controlled by the first processor 210. In FIG. 2, control signals are indicated by a dotted line, and other signals are indicated by a solid line.

The sensor modules of the electronic device 201 may include temperature sensor or a plurality of temperature sensors (e.g., thermistors). For example, as illustrated in FIG. 2, the electronic device 201 includes the first to fifth temperature sensors 245, 255, 265, 225, and 215. However, the number of temperature sensors is not limited to five, and may be more or less than five.

The first temperature sensor 245 may be disposed on at least a portion of a PCB and functionally connected to the second processor 220 (e.g., a CP). The first temperature sensor 245 may be mounted on the first antenna module 240 and functionally connected to the second processor 220.

The second temperature sensor 255 may be mounted on the second antenna module 250 and functionally coupled to the second processor 220, e.g., through a flexible PCB (FPCB).

The third temperature sensor 265 may be disposed on at least a portion of an FPCB connected to the third antenna module 260 and functionally connected to the second processor 220 through the FPCB.

The fourth temperature sensor 225 may be disposed on at least a portion of a sub-PCB adjacent to the second processor 220 and functionally connected to the second processor 220 through the sub-PCB.

The fifth temperature sensor 215 may be disposed adjacent to the first processor 210 (e.g., an AP) and functionally connected to the first processor 210 or the second processor 220 through a PCB.

Each of the temperature sensors 245, 255, 265, 225, and 215 may receive a temperature measurement message or an interrupt signal from the first processor 210 or the second processor 220, and may measure temperature values of a component related to each temperature sensor 245, 255, 265, 225, or 215. Each of the temperature sensors 245, 255, 265, 225, and 215 may continuously measure a temperature value, and if necessary, the first processor 210 and/or the second processor 220 may request the temperature value measured by each temperature sensor 245, 255, 265, 225, or 215.

At least some of the plurality of temperature sensors may be disposed adjacent to the antenna modules (e.g., the first to third antenna modules 240, 250, and 260) and can measure a temperature caused by heat which can be generated through the antenna modules. The plurality of temperature sensors 245, 255, 265, 225, and 215 included in the electronic device 201 may be connected to a separate component (e.g., a temperature monitor module) for monitoring the temperature. For example, such a separate component for monitoring the temperature may be functionally connected to the first processor 210 and/or the second processor 220.

The above-described arrangement of the temperature sensors is only an example and the disclosure is not limited thereto.

The electronic device 201 may also include a separate component (e.g., a temperature monitor module or circuit) for monitoring at least one temperature sensor. For example, the temperature monitor module may include at least one temperature sensor and a processor. The temperature monitor module may be included in a processor (e.g., the first processor 210 or the second processor 220).

When measuring a temperature (or a temperature value) by using a plurality of temperature sensors, the electronic device 201 may use each measured temperature value or determine a "representative temperature value" as a temperature value of the electronic device 201 and use it. For example, the electronic device 201 may determine the "representative temperature value", based on at least one temperature value measured using a plurality of temperature sensors.

Figure 3:
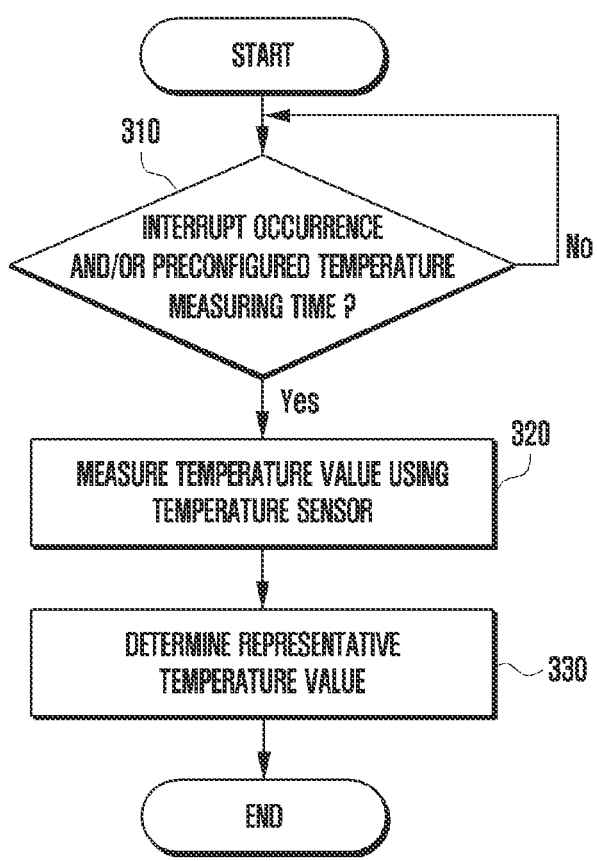
FIG. 3 is a flow chart illustrating a method for determining a representative temperature value of an electronic device according to an embodiment.

FIG. 3 is a flow chart illustrating a method for determining a representative temperature value of an electronic device according to an embodiment. For example, the method of FIG. 3 will be described below as being performed by the electronic device 201 of FIG. 2.

Referring to FIG. 3, in step 310, a processor (e.g., the processor 120 in FIG. 1, the first processor 210 in FIG. 2, or the second processor 220 in FIG. 2) of the electronic device (e.g., the electronic device 201 in FIG. 2) checks whether an interrupt signal related to temperature (e.g., requesting temperature measurement) or temperature value measurement occurs or a preconfigured temperature measurement time (e.g., a certain time interval) arrives.

Upon determining that a temperature value is required, the processor of the electronic device 201 may generate an interrupt signal (or message) and transmit it to the first temperature sensor 245. The first temperature sensor 245 may receive the interrupt signal generated by the processor of the electronic device 201 and measure a temperature value in response to the reception of the interrupt signal. The first temperature sensor 245 may transmit the measured temperature value to the processor of the electronic device 201 and/or store it in a memory (e.g., the memory 130 in FIG. 1) included in the electronic device 201. The processor of the electronic device 201 may measure a temperature value at a preconfigured time. The preconfigured time may be a regular time interval (e.g., 15 minutes, 30 minutes, etc.). The preconfigured time and/or the generation time of the interrupt signal may be configured by the processor of the electronic device 201. For example, the processor 210 may determine the preconfigured time and/or the interrupt signal generation time in consideration of the type and/or number of applications being executed.

When the interrupt signal occurs and/or the preconfigured temperature measurement time arrives in step 310, the processor of the electronic device performs step 320.

If the interrupt signal does not occur and/or the preconfigured temperature measurement time does not arrive in step 310, the processor continues to perform step 310.

In step 320, the processor measures a temperature value of at least one component or module by using at least some of a plurality of temperature sensors (e.g., the first to fifth temperature sensors 245, 255, 265, 225, and 215 in FIG. 2). As described in relation to FIG. 2, a temperature sensor (e.g., the first temperature sensor 245 in FIG. 2) may be disposed near at least one component or module, and the processor of the electronic device 201 may measure a temperature value by using the temperature sensor (e.g., the first temperature sensor 245 in FIG. 2).

In step 330, the processor of the electronic device 201 determines a representative temperature value by using the temperature value measured using the temperature sensor. The processor may determine the representative temperature value of the electronic device 201 by using at least one of temperature values measured by temperature sensors related to modules (or components) inside the electronic device 201.

The processor of the electronic device 201 may determine that an average value of temperature values measured by at least one temperature sensor is the representative temperature value. For example, when the temperatures measured by the first to third temperature sensors 245, 255, and 265 are about 40 degrees, about 48 degrees, and about 52 degrees, respectively, the processor 210 of the electronic device 201 may determine that an average value (about 47 degrees) of the measured temperatures is the representative temperature value.

The processor of the electronic device 201 may map a temperature value measured by at least one temperature sensor to a predetermined temperature section, and determine that a representative value of the section is the representative temperature value. For example, if the temperature measured by the temperature sensor is about 41 degrees, a representative value (40 degrees) of a section (e.g., a temperature range of 38 to 42 degrees and a representative value of 40 degrees) containing the measured temperature (about 41 degrees) may be the representative temperature value. The processor of the electronic device 201 may determine that the highest temperature value among temperature values measured by at least one temperature sensor is the representative temperature value. For example, if the temperatures measured by the first to third temperature sensors 245, 255, and 265 are about 40 degrees, about 53 degrees, or about 45 degrees, respectively, the processor 210 may determine that the highest temperature value (53 degrees) is the representative temperature value.

In order to use a temperature value measured by at least one temperature sensor as the representative temperature value, a processor of the electronic device 201 may process the measured temperature value in a designated form. For example, in case of using an average value of temperature values measured by at least one temperature sensor as the representative temperature value, the average value may be processed in the form of a natural number or an integer. At least one temperature sensor may process a measured temperature value in a designated form (e.g., a natural number or an integer) and transmit the processed value to the processor.

A processor of the electronic device 201 may predict a temperature value of a specific region of the electronic device by using a temperature value of at least one temperature sensor. For example, based on the temperature value of the at least one temperature sensor, the processor 210 of the electronic device 201 may predict the temperature value of the specific region through a machine learning technique.

A processor of the electronic device 201 may determine the representative temperature value by using a temperature value of a temperature sensor located near a heat-generating component among various modules (or components) included in the electronic device 201. The heat-generating component among various modules (or components) included in the electronic device 201 may include at least one electrical element included in the electronic device 201, e.g, a battery (e.g., the battery 189 in FIG. 1), a first processor (e.g., the first processor 210 in FIG. 2), a second processor (e.g., the second processor 220 in FIG. 2), and/or an antenna module (e.g., the first to third antenna modules 240, 250, and 260 in FIG. 2), and the electronic device 101 may measure temperature values through temperature sensors (e.g., the first to fifth temperature sensors 245, 255, 265, 225, and 215 in FIG. 2) disposed near these elements. A processor of the electronic device 201 may determine that one of the measured temperature values is the representative temperature value.

A processor of the electronic device 201 may identify a module having a relatively large current consumption inside the electronic device 201 and determine that a temperature value measured by a temperature sensor disposed adjacent to the identified module is the representative temperature value. For example, if the current consumption is relatively large in a first antenna module (e.g., the first antenna module 240 in FIG. 2), a temperature value measured by a first temperature sensor (e.g., the first temperature sensor 245 in FIG. 2) in the vicinity of the first antenna module 240 may be determined as the representative temperature value. If the current consumed is relatively large in a first processor (e.g., the first processor 210 in FIG. 2), a temperature value measured by a fifth temperature sensor (e.g., the fifth temperature sensor 215 in FIG. 2) in the vicinity of the first processor 210 may be determined as the representative temperature value.

The representative temperature value may be predicted based on a temperature value measured by a temperature sensor associated with a module (or component) inside the electronic device 201, and/or determined by calculation. For example, a processor of the electronic device 201 may give a weight (e.g., 0.5 times, 1.5 times, 2 times) to the temperature value of a module generating heat inside the electronic device 201, and determine the representative temperature value through average and/or summation. The weight may be determined by a manufacturer of the module, or may be determined by the processor of the electronic device 201 or a user. For example, the temperature value of the first processor may be configured by calculating the weight (e.g., 2 times) assigned to the temperature value measured by the first processor 210, or the temperature value of the second antenna module may be configured by calculating the weight (e.g., 0.5 times) assigned to the temperature value measured by the second antenna module (e.g., the second antenna module 250 in FIG. 2). The representative temperature value of the electronic device 201 may be determined based on a running application and/or a function (e.g., call, image reproduction, charging, or a connected vehicle communication) being used in the electronic device 201. For example, if a game application is running, a processor of the electronic device 201 may measure a temperature value from a temperature sensor associated with a module (or component) most used in the game application. For example, if the game application uses the first processor 210 the most, the processor 210 of the electronic device 201 may determine that a temperature value measured by the fifth temperature sensor 215 in the vicinity of the first processor 210 is the representative temperature value. For example, if a high-definition streaming application is running, the high-definition streaming application exchanges data in real time with an external electronic device (e.g., the server 108 in FIG. 1) through a communication module (e.g., the communication module 190 in FIG. 1), and thus a temperature value measured by the fourth temperature sensor (e.g., the fourth temperature sensor 225 in FIG. 2) in the vicinity of the second processor (e.g., the communication processor (CP), the second processor 220 in FIG. 2) having the highest possibility of heat generation may be determined as the representative temperature value.

For example, if a call function of the electronic device 201 is in use, the electronic device 201 exchanges data in real time with a base station through the communication module, and thus a processor of the electronic device 201 may determine that a temperature value measured by the fourth temperature sensor 225 in the vicinity of the second processor 220 having the highest possibility of heat generation is the representative temperature value. For example, if the battery is being charged, the processor of the electronic device 210 may determine that a temperature value measured by a temperature sensor for measuring a temperature value of the battery is the representative temperature value. As such, while monitoring the functions and/or applications being used in the electronic device 201 in real time/periodically, a processor of the electronic device 201 may determine that a temperature value measured by a temperature sensor near a module having the highest possibility of heat generation is the representative temperature value.

A processor of the electronic device 201 may provide an eMBB communication service such as augmented reality (AR), 360-degree video, and virtual reality (VR) to a user. Because the eMBB communication service requires a higher data transfer rate, a processor of the electronic device 201 may determine the representative temperature value by using temperature values measured, e.g., by the fourth temperature sensor 225 measuring a temperature in the vicinity of the second processor 220 and/or the first to third temperature sensors 245, 255, and 265 measuring temperatures associated with the respective antenna modules. For example, in case of providing the eMBB communication service, a processor of the electronic device 201 may determine the representative temperature value by configuring the weights (e.g., 1.2) of the temperature values (e.g., 41 degrees, 38 degrees, and 38 degrees) measured by the first to third temperature sensors 245, 255, and 265 to be higher than the weight (e.g., 0.8) of the temperature value (e.g., 39 degrees) measured by the fourth temperature sensor 225.

A processor of the electronic device 201 may provide a URLLC service such as autonomous vehicles, factory automation, telemedicine, and AR. Because the URLLC service requires ultra-reliable and low-latency communication, a processor of the electronic device 201 may determine the representative temperature value by using temperature values measured, e.g., by the fourth temperature sensor 225 and the fifth temperature sensor 215 measuring temperatures in the vicinity of the first processor 210 and the second processor 220. For example, in case of providing the URLLC service, a processor of the electronic device 201 may determine the representative temperature value by configuring the weight (e.g., 1.3) of the temperature value (e.g., 41 degrees) measured by the fifth temperature sensor 215 to be higher than the weight (e.g., 0.9) of the temperature value (e.g., 40 degrees) measured by the fourth temperature sensor 225.

A processor of the electronic device 201 may provide an mMTC service such as energy meter reading and health/medical care. Because the mMTC service transmits/receives relatively low-capacity data at a low speed, a processor of the electronic device 201 may determine the representative temperature value by using, e.g., temperature values measured by temperature sensors related to all modules (or components) included in the electronic device. For example, in case of providing the mMTC service, a processor of the electronic device 201 may determine the representative temperature value by configuring the weights (e.g., 1) of the temperature values (e.g., 42 degrees, 38 degrees, 39 degrees, 42 degrees, and 41 degrees) measured by the first to fifth temperature sensors 245, 255, 265, 225, and 215 to be equal.

When the configuration of the representative temperature value is changed, a processor of the electronic device 201 may correct temperature values so that an abrupt change does not occur. For example, when the temperature sensor for determining the representative temperature value is changed from the first temperature sensor 245 to the second temperature sensor 255, the amount of change in the representative temperature value measured by the temperature sensor may be large.

A processor of the electronic device 201 may compensate for a sudden change in the representative temperature value. For example, when the representative temperature value is changed from the value of the third temperature sensor (e.g., the third temperature sensor 265 in FIG. 2) for measuring the temperature of the third antenna module (e.g., the third antenna module 260 in FIG. 2) to the value of the fifth temperature sensor 215 for measuring the temperature in the vicinity of the first processor 210, and if a difference between temperature values measured by the temperature sensors 215 and 265 is large, the representative temperature value may be determined to be changed gradually for a specific time. For example, if the value of the third temperature sensor 265 is 20 degrees and the value of the fifth temperature sensor 215 is 40 degrees, a processor of the electronic device 201 may change the representative temperature value in the order of 24 degrees, 27 degrees, 33 degrees, 36 degrees, and 40 degrees to increase in proportion to temperature values for a specific time of 5 seconds. The specific time may vary according to a difference between the measured temperature sensor values. For example, the specific time may be configured differently, such as 5 seconds when the difference between the temperature sensor values is 20 degrees, and 10 seconds when 40 degrees.

Although some examples have been described above, in which a processor of the electronic device 201 determines the representative temperature value based on the value of one temperature sensor, the representative temperature value may also be determined using a plurality of temperature sensors. The representative temperature value may be managed as a database (e.g., a table) in a storage space (e.g., the memory 130 in FIG. 1) inside the electronic device 201, and the representative temperature value may be matched with at least one of the temperature values of the plurality of temperature sensors depending on the function and/or the characteristics of the application being used in the electronic device 201. As an example of the matching operation, the electronic device 201 may classify applications according to a mainly used processor between the first processor 210 and the second processor 220 and designate any one of the temperature values of the processors as the representative temperature value.

The electronic device 201 may configure a plurality of representative temperature values. For example, when a function and/or application highly related to heat generation control in the electronic device 201 is executed, the temperature values of a plurality of modules (or components) corresponding to the executed function and/or application among the temperature values of a plurality of temperature sensors may be configured as the representative temperature values. For example, when a function (or application) is provided to a system to support a telemedicine system or remote surgery, the electronic device 201 may configure the temperature value of the first temperature sensor 245 associated with the first antenna module 240 and the temperature value of the fourth temperature sensor 225 associated with the second processor 220 as the representative temperature values.

A module (or component) and/or a temperature sensor (e.g., the temperature sensors 245, 255, 265, 225, and 215) associated with the determination of the representative temperature value are not limited to the example illustrated in FIG. 2, and the number and/or location of modules (or components) and/or temperature sensors 245, 255, 265, 225, and 215 may vary.

Additionally, step 330 of FIG. 3 for determining the representative temperature value is also not limited to the described embodiment and may vary. For example, the electronic device 201 may transmit and receive a policy related to the determination of the representative temperature value to and from an external electronic device (e.g., the server 108). The policy may include, in addition to the policy related to the determination of the representative temperature value, information (e.g., a network type, a frequency band, a support network, a clock frequency, or the amount of data transfer) related to modules (or components) constituting the electronic device 201, an external electronic device (e.g., the server 108), and/or a network (e.g., the first network 198 and the second network 199 in FIG. 1). Information about a module (or component) and/or weight to be used for determining the representative temperature value may be included in the policy.

Figure 4:
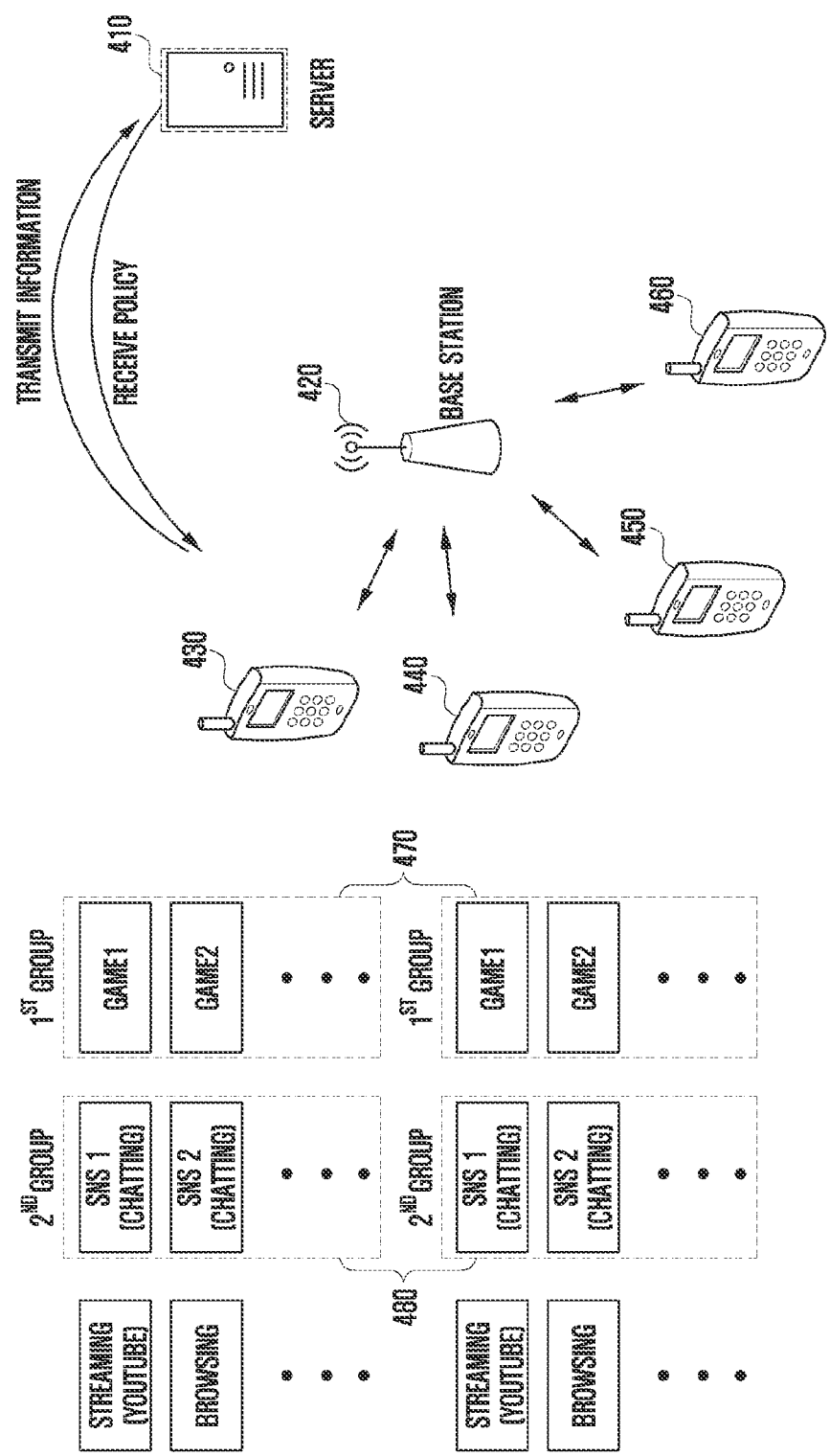
FIG. 4 illustrates a system according to an embodiment.

FIG. 4 illustrates a system according to an embodiment.

Referring to FIG. 4, the system includes a server 410, a base station 420, and electronic devices 430, 440, 450, and 460. At least one of the electronic devices 430, 440, 450, or 460 may be identical or similar the electronic device 201 of FIG. 2.

At least one electronic device 430, 440, 450, or 460 may transmit/receive data through the base station 420. For example, when a communication scheme is NR, the base station 420 may be a gNodeB (gNB). The at least one electronic device 430, 440, 450, or 460 may execute various applications and identify information (e.g., status information) related to the electronic device 430, 440, 450, or 460 and/or the base station 420. The information related to the electronic device 430, 440, 450, or 460 and/or the base station 420 may include the frequency and/or period of access to the base station 420, the amount of data transmitted/received with the base station 420 and/or the amount of data processed for a unit time (throughput), and a temperature value (e.g., a representative temperature value, a temperature value of a temperature sensor).

The at least one electronic device 430, 440, 450, or 460 may transmit at least one of the information related to the electronic device 430, 440, 450, or 460 and/or the base station 420 to the server 410. The at least one electronic device 430, 440, 450, or 460 may receive, from the server 410, at least one of status information of the server 410, a policy (e.g., a first policy 920, a second policy 925 in FIG. 9), a priority of the policy, or a policy validity period.

The server 410 may collect and analyze information that the at least one electronic device 430, 440, 450, or 460 transmits by executing and checking (e.g., monitoring) each application. The server 410 may classify and group the applications used by the electronic device 430, 440, 450, or 460, and determine a policy capable of optimizing the current consumption and/or heat generation by the electronic device 430, 440, 450, or 460 for each application group. For example, the server 410 may group applications (e.g., a game) using a first processor (e.g., the first processor 210 in FIG. 2) inside the electronic device 430, 440, 450, or 460 into a first group 470, and group applications (e.g., a messenger) using a communication module (e.g., the communication module 190 in FIG. 1) into a second group 480.

The server 410 may determine and/or process (e.g., transmit) a policy related to an application executed in at least one electronic device 430, 440, 450, or 460. The server 410 may transmit the policy determined for the execution of the application to the at least one electronic device 430, 440, 450, or 460. The policy may include resource information (e.g., frequency band information available in a network, information about a network available for the electronic device 430, 440, 450, or 460) and/or information (e.g., clock frequency) about a processor (e.g., the first processor 210 or the second processor 220) of the electronic device 430, 440, 450, or 460.

The at least one electronic device 430, 440, 450, or 460 may execute an application by controlling an internal module and/or component based on the received policy.

The at least one electronic device 430, 440, 450, or 460 may determine a policy required for application execution by analyzing information checked (e.g., monitored) during the execution of the application. Upon monitoring that a game application is executed and a temperature value (e.g., 43 degrees) around a first processor is high, the electronic device 430, 440, 450, or 460 may determine and/or perform a policy of adjusting a CPU level of the first processor.

Figure 5:
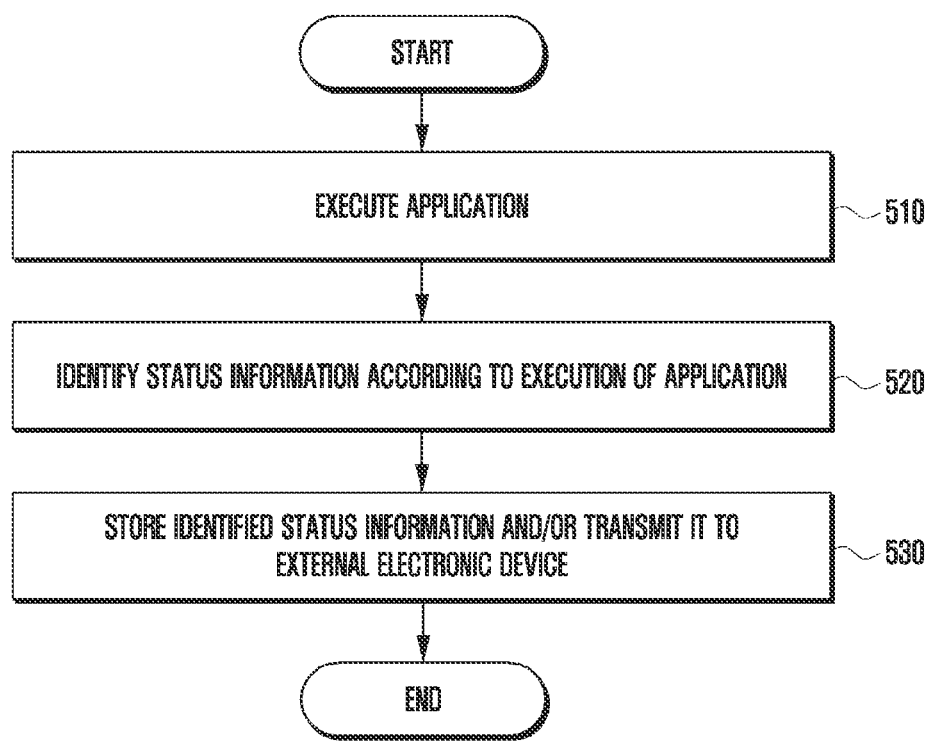
FIG. 5 is a flow chart illustrating a method for establishing and/or supporting a policy in an electronic device according to an embodiment.

FIG. 5 is a flow chart illustrating a method for establishing and/or supporting a policy in an electronic device according to an embodiment. For example, the method of FIG. 5 will be described below as being performed by the electronic device 201 of FIG. 2.

Referring to FIG. 5, in step 510, the electronic device (e.g., the electronic device 201 in FIG. 2) executes an application. Executing the application may be performed by a first processor (e.g., the first processor 210 in FIG. 2) of the electronic device 201. The electronic device 201 may identify a policy for each application before executing the application and, based on the identified policy, execute the application. For example, when the electronic device 201 transmits information about an application to be executed to a server, the server may transmit a policy to be performed by the electronic device 201. The electronic device 201 may identify the policy received from the server and execute the application in accordance with the policy.

The policy may be changed in real time, before, and/or after the application execution, and the electronic device 201 may identify the changed policy in real time, before, and/or after the application execution. For example, the electronic device 201 may transmit a changed representative temperature value to the server in real time, and the server may transmit a changed policy to the electronic device 201 based on the representative temperature value. The electronic device 201 may identify the changed policy received from the server and execute the application in accordance with the changed policy.

Although the electronic device 201 executing an application is described as an example above, the disclosure is not limited thereto. The method of FIG. 5 may also be applied when performing other functions (e.g., call, image reproduction, charging, or connected car communication) of the electronic device 201.

In step 520, a processor of the electronic device 201 identifies (monitor) status information according to application execution. For example, the processor of the electronic device 201 may monitor a network access frequency, a network access period, the amount of transmitted/received data, a temperature value of a temperature sensor, and/or an operating state of an application. The processor of the electronic device 201 may monitor a temperature value measured using an internal temperature sensor as described above, the type of network used by the electronic device 201 to transmit/receive data related to an application, the number of times to access a network within a certain time, an access period, and/or the amount of transmitted/received data. The monitoring of network-related matters by the processor of the electronic device 201 may be performed by a second processor (e.g., the second processor 220 in FIG. 2).

When an application is executed, the first processor (e.g., the first processor 210 in FIG. 2) of the electronic device 201 may trigger (e.g., interrupt, send a message, etc.) the second processor 220 of the electronic device 201 to process (e.g., monitor) at least one of a pattern of data transmitted/ received using a 5G network, a temperature value of a temperature sensor (e.g., the first to fifth temperature sensors 245, 255, 265, 225, or 215 in FIG. 2), or the operating state of the application. When the application is terminated, the first processor 210 of the electronic device 201 may stop processing requested to the second processor 220 of the electronic device 201 with a trigger. The first processor 210 of the electronic device 201 may transmit a processing termination request to the second processor 220 of the electronic device 201 as an interrupt or a message.

When the application is terminated, the second processor 220 of the electronic device 201 may transmit the processed information to the first processor 210 of the electronic device 201, and the first processor 210 of the electronic device 201 may store the information received from the second processor 220 of the electronic device 201.

In step 530, when the application is being executed or the application is terminated, a processor of the electronic device 201 stores the identified (monitored) information (status information) and/or transmits it to an external electronic device (e.g., a server).

At regular time intervals and/or upon occurrence of an interrupt signal, the electronic device 201 may transmit the monitored information to an external electronic device or store it in an internal memory. When receiving a request from the external electronic device, the electronic device 201 may transmit the monitored information to the external electronic device.

When a network being used by the electronic device 201 is changed, a processor of the electronic device 201 may store the identified (monitored) information (status information) and/or transmit it to the external electronic device. For example, when the network being used by the electronic device 201 is changed in response to a user input in the electronic device 201 or a request from a base station, the status information may be stored and/or transmitted to an external electronic device such as a server.

A processor of the electronic device 201 may control the internal modules and/or components of the electronic device 201 by establishing a policy based on stored information and/or by using a policy received from a server. For example, a processor of the electronic device 201 may execute an application by using a policy received from the external electronic device. In another example, in an idle state, a processor of the electronic device 201 may perform a control operation on internal modules and/or components in order to reduce power consumption of the electronic device 201 and control heat generation.

Figure 6:
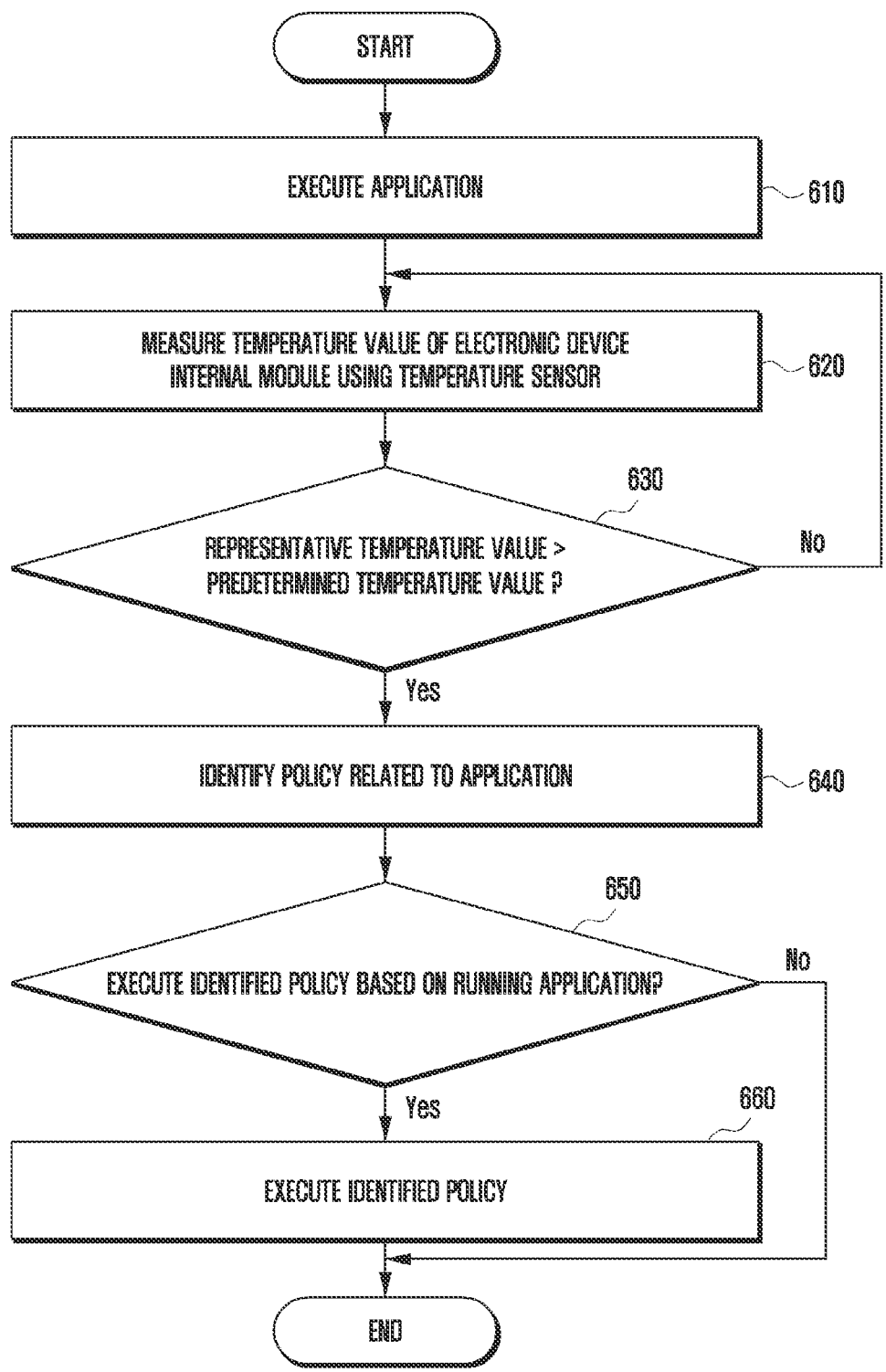
FIG. 6 is a flow chart illustrating a method for controlling power and/or heat generation based on a policy in an electronic device according to an embodiment.

FIG. 6 is a flow chart illustrating a method for controlling power and/or heat generation based on a policy in an electronic device according to an embodiment. For example, the method of FIG. 6 will be described below as being performed by the electronic device 201 of FIG. 2.

Referring to FIG. 6, in step 610, a processor of the electronic device 201 executes an application. The application may be performed by a first processor (e.g., the first processor 210 in FIG. 2). As described above, the method is not limited to execution of an application, but may also be applied to performing other functions (e.g., call, image reproduction, charging, or connected car communication) of the electronic device 201.

In step 620, a processor of the electronic device 201 measures a temperature value of an internal module and/or component of the electronic device 201 by using a temperature sensor (e.g., the first to fifth temperature sensors 245, 255, 265, 225, or 215). For example, a processor of the electronic device 201 may transmit an interrupt signal (or message) requesting the measurement of a temperature value to the temperature sensor or a plurality of temperature sensors 215, 225, 245, 255, and 265.

In step 630, a processor of the electronic device 201 determines whether a representative temperature value is greater than a configured temperature value. A processor of the electronic device 201 may measure a temperature value by using at least one temperature sensor 245, 255, 265, 225, or 215 and determine the representative temperature value by using the at least one measured temperature value. The processor of the electronic device 201 may determine whether the determined representative temperature value is higher than the configured temperature value.

If the representative temperature value is less than or equal to the configured temperature value, the processor of the electronic device 201 performs step 620 again.

However, if the representative temperature value is greater than the configured temperature value, the processor of the electronic device 201 identifies a policy related to an application in step 640. For example, the policy may be received from an external electronic device (e.g., a server) or determined directly by the electronic device 201. Because the representative temperature value is greater than the configured temperature value, the policy may include information about internal components and/or modules of the electronic device that is configured to lower, or not to increase anymore, the representative temperature value.

In case that the electronic device 201 directly determines the policy, the electronic device 201 may determine the policy, based on the information (status information) identified (monitored) step 520 of FIG. 5. For example, if an application (or service) requires a large amount of data transfer, the processor of the electronic device 201 may determine a policy for receiving data within a short time and minimizing energy consumption of the electronic device by increasing a CPU clock of the first processor 210 (e.g., an AP) to the maximum and/or increasing a CPU clock of a second processor (e.g., the second processor 220 in FIG. 2) (e.g., a CP) to the maximum at an acceptable level of heat generation in the electronic device 201 and/or by allocating 5G NR rather than the existing long term evolution (LTE) to a network (e.g., communication scheme).

As another example, if an application (or service) requires a large amount of data transfer and a low transmission delay of the network, the processor of the electronic device 201 may increase a bandwidth used by the network while maintaining the 5G NR as the network (e.g., a communication scheme) at an acceptable level of heat generation in the electronic device 210. If data has been transmitted/received using a first antenna module (e.g., the first antenna module 240 in FIG. 2), the second processor 210 of the electronic device 201 may transmit/receive data by further using a second antenna module (e.g., the antenna module 250 in FIG. 2) while maintaining the network.

In case of receiving a policy from an external electronic device (e.g., a server), a processor of the electronic device 201 may identify the received policy. The processor of the electronic device 201 may request a policy from the external electronic device, and the external electronic device may transmit the policy to the electronic device 201. The processor of the electronic device 201 may also transmit information about an application to be executed to the external electronic device. When the electronic device 201 accesses the external electronic device, the external electronic device may transmit a policy to the electronic device 201.

In step 650, based on the application being executed, the processor of the electronic device 201 determines whether to execute the identified policy.

The processor of the electronic device 201 may identify the type of the application being executed (or a service being provided) and identify a specified requirement related to the application. For example, in case of having to ensure a minimum QoS required by the application as the specified requirement, the processor of the electronic device 201 may determine whether the identified policy can ensure the minimum QoS. For example, the processor of the electronic device 201 identifies that the running application is an application having to ensure a large amount of data transfer in real time, but the policy identified in step 640 may be a policy in which network switching is configured to reduce the amount of data transfer to lower the representative temperature value. In this case, in order to ensure QoS, the processor of the electronic device 201 may determine not to execute the policy identified in step 640. Even if the representative temperature value increases, the processor of the electronic device 201 may ensure the QoS of the application by maintaining the network (e.g., 5G NR) without switching the network.

In case of a function (or application) provided to a system to support a telemedicine system or a remote surgery, the processor of the electronic device 201 may identify the specified requirement related to the function provided to the system. For example, in case that the specified requirement is a communication latency time, because a delay in data transmission causes a problem, the processor of the electronic device 201 may not switch to a network with a relatively slow transfer rate even if the representative temperature value increases. As another example, the URLLC service such as autonomous driving may require a QoS that does not cause network disconnection or delay. The processor of the electronic device 201 may not switch the network even if the identified policy includes a network switch that may cause a data transmission delay in order to lower the representative temperature value.

The processor of the electronic device 201 may control the internal components and/or modules of the electronic device 201 in addition to the amount of data transfer. For example, when the electronic device is charging the battery, the processor of the electronic device 201 may stop charging the battery.

The processor of the electronic device 201 performs step 660 when the identified policy can ensure the minimum QoS, but otherwise may not execute the identified policy.

In step 660, the processor of the electronic device 201 controls the internal components and/or modules of the electronic device 201, based on the identified policy. Based on a policy received from the external electronic device or a policy directly determined, the processor of the electronic device 201 may control the internal components of the electronic device 201. The policy may be configured differently depending on the status of the electronic device 201 (e.g., the degree of heat generation and/or the amount of current consumption) even for one application. For example, when the processor of the electronic device 201 executes one application while another application is being executed and thus the amount of heat generation is significant, or when the first processor 210 of the electronic device 201 wakes up from the idle mode and executes an application, the external electronic device may select different policies and transmit them to the electronic device 201.

The electronic device 201 may use only a part of a policy or change the policy. For example, when the electronic device 201 is in a heat generation state as a result of identifying the representative temperature value, the electronic device 201 may adjust (e.g., lower) only the CPU clock of the first processor 210 despite a policy of adjusting (e.g., lowering) the CPU clocks of the first and second processors 210 and 220.

In case that the type of service is determined as a service that is not sensitive to the communication speed of the network, the electronic device 201 may switch from a network (e.g., 5G NR) supporting low-latency communication to another network (e.g., LTE, WiFi) when the temperature value of the electronic device 201 is higher than the configured temperature value. In case that the type of service does not have a high risk for low latency, the electronic device 201 may lower the temperature value and maintain the QoS while performing a switch between 5G NR and LTE based on a certain time and/or temperature value.

The electronic device 201 may determine and perform network switching, based on a service (or application) type, a representative temperature value, and/or a user's setting.

Figure 7:
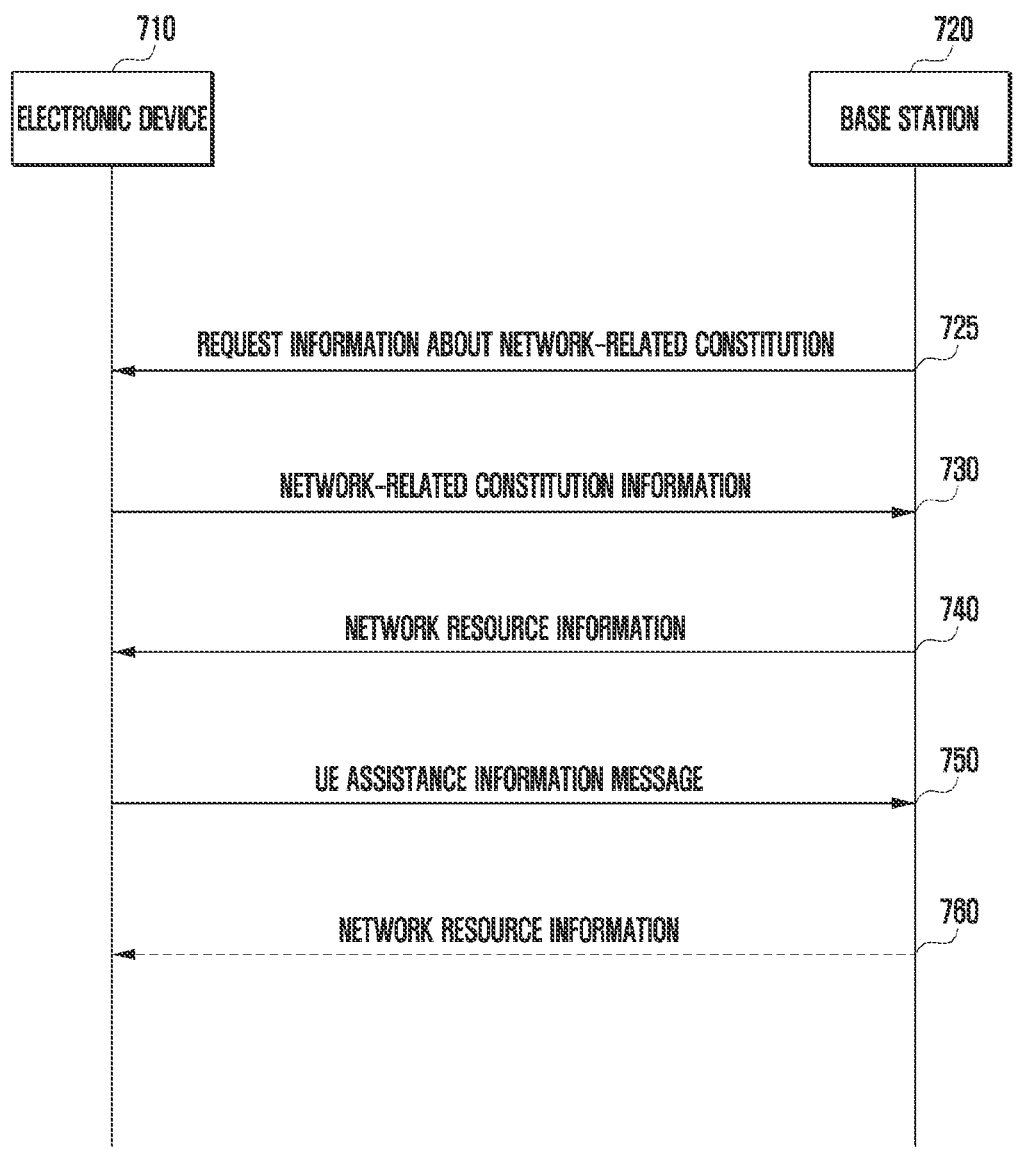
FIG. 7 is a signal flow diagram illustrating communication between a base station and an electronic device according to an embodiment.

FIG. 7 is a signal flow diagram illustrating communication between a base station and an electronic device according to an embodiment.

Referring to FIG. 7, an electronic device 710 may receive a policy from an external electronic device or determine a policy to be performed by the electronic device 710. The electronic device 710 may communicate (e.g., negotiate) with a base station 720 to control internal components of the electronic device 710, based on a policy upon the execution of an application.

More specifically, in step 725, the base station 720 requests information about a network-related components and/or modules from the electronic device 710. The network-related component and/or module information may include information about a frequency band available in a network (e.g., a system operating band included in the network) and/or information about a network supportable by the electronic device 710 (e.g., whether 5G NR is supportable).

In step 730, the electronic device 710 transmits the network-related component and/or module information (e.g., status information) to the base station 720 in response to the request for the network-related component and/or module information. The electronic device 710 may transmit information about an available network-related components and/or modules (e.g., whether 5G NR is supportable/usable, whether WiFi is supportable/usable).

The electronic device 710 may further transmit capability information of the electronic device 710 to the base station 720. The electronic device 710 may transmit the capability information of the electronic device 710 by using, for example, a user equipment (UE) capability message. For example, the UE capability message may be a message through which the electronic device 710 transmits information about the capability of the electronic device 710 to the base station 720. The electronic device 710 may add information about a heat generation state of the electronic device (e.g., a representative temperature value of the electronic device 710) in the UE capability message. At least one flag may be further contained in the UE capability message, and the flag may be configured as 1 (or true) when the representative temperature value is greater than or equal to a predetermined temperature value. The UE capability message may include information about frequency bands supported by the electronic device 710, and a flag related to each frequency band may also be included. Using the UE capability message, the electronic device 710 may request a network resource in a frequency band supported by an antenna module other than an antenna module that generates excessive heat.

In step 740, the base station 720 transmits, to the electronic device 710, information about a network resource allocated to the electronic device 710, based on the network-related component and/or module information of the electronic device 710 and/or the capability information of the electronic device 710, which is received from the electronic device 710. For example, a radio resource control (RRC) connection reconfiguration message may be used to transmit the network resource information. The RRC connection reconfiguration message may be used to modify an RRC connection and also used to establish, modify, or release a radio bearer or perform a handover. The base station 720 may reconstitute a network resource, based on information about the performance of the electronic device transmitted by the electronic device 710. The base station 720 may transmit information about the reconstituted network resource by adding it in the RRC connection reconfiguration message. The base station 720 may allocate a resource of a frequency band requested by the electronic device 710 and transmit information about the allocated resource of the frequency band by adding it in the RRC connection reconfiguration message. Information about a resource capable of transmitting a UE assistance information message may also be added in the RRC connection reconfiguration message. In relation to the UE assistance information message, at least one of a logical channel identifier (LCID), a retransmission prohibit timer, and a duration of the UE assistance information message may be added in the RRC connection reconfiguration message.

In step 750, after identifying the allocated network resource information, the electronic device 710 transmits the UE assistance information message to the base station 720, based on the status of the electronic device 710. The electronic device 710 may identify the allocated network resource information by using the RRC connection reconfiguration message.

The UE assistance information message may include information (e.g., overheatingAssistConfig) indicating that the electronic device 710 is in an overheating state. The information indicating the overheating state may contain information about a transfer rate associated with communication with the base station 720. The information about the transfer rate associated with communication with the base station 720 may include at least one of the number of cells connectable by carrier aggregation, the number of MIMO layers, category information of the electronic device, and/or total bandwidth information (e.g., total active bandwidth and/or total configured bandwidth).

In case that the electronic device 710 uses a technology for receiving data from a plurality of cells (e.g., carrier aggregation or dual connectivity), the electronic device 710 may change a network-related constitution for each of the plurality of base stations 720. For example, the electronic device 710 may change the network-related constitution to a master node and a secondary node. The electronic device 710 may perform a communication network connection and/or data transmission/reception through the master node, and may transmit/receive data to/from the secondary node. The UE assistance information message may include configuration information about the master node and/or network configuration information (e.g., a frequency band) about the secondary node. In this case, the UE assistance information message may be transmitted to the master node and/or the secondary node.

In step 760, the base station 720 transmits network resource information to the electronic device 710. In case of reconstituting a network resource in response to a request of the electronic device 710, the base station 720 may transmit information about the reconstituted network resource to the electronic device 710 by using the RRC connection reconfiguration message. In case of rejecting the request of the electronic device 710, the base station 720 may transmit the RRC connection reconfiguration message configured with the same value as in the existing configuration to the electronic device 710. In case of rejecting the request of the electronic device 710, the base station 720 may not transmit the RRC connection reconfiguration message to the electronic device 710. The electronic device 710 may receive the RRC connection reconfiguration message from the base station 720 and then perform an operation for reconstituting the network by using network resource information contained in the RRC connection reconfiguration message.

Because network resources that the base station 720 can support may be changed in real time, the electronic device 710 may request the reconstitution of network resources frequently and/or periodically, the base station 720 may reconstitute the network resources in consideration of the situation of the network resources. For example, in case that the electronic device 710 transmits a large amount of data to the base station 720, if the amount of data is greater than the capacity that the base station 720 can process, or if the number of electronic devices that the base station 720 should support is greater than a predetermined number, the base station 720 may change the network resources to support low-speed communication from high-speed communication or change an allocation cycle for a frequency. The network resources may be determined through determination of the base station 720, a request by an external electronic device, and/or a message received from the electronic device 710.

The base station 720 may determine the network resource reconstitution operation for reception of the UE assistance information message. The base station 720 may have the right to reconstitute network resources. In case that reconstitution cannot be performed due to insufficient network resource or insufficient information for network reconstitution even if the base station 720 receives the UE assistance information message, the base station 720 may not transmit a message related to network resource information to the electronic device 710. Alternatively, the base station 720 may transmit the previously sent RRC connection reconfiguration message again to the electronic device 710.

The above-described message is only an example and should not be construed as a limitation. As long as the above-described or similar information is included therein, it may be possible to use a newly created message or the existing message.

Figure 8:
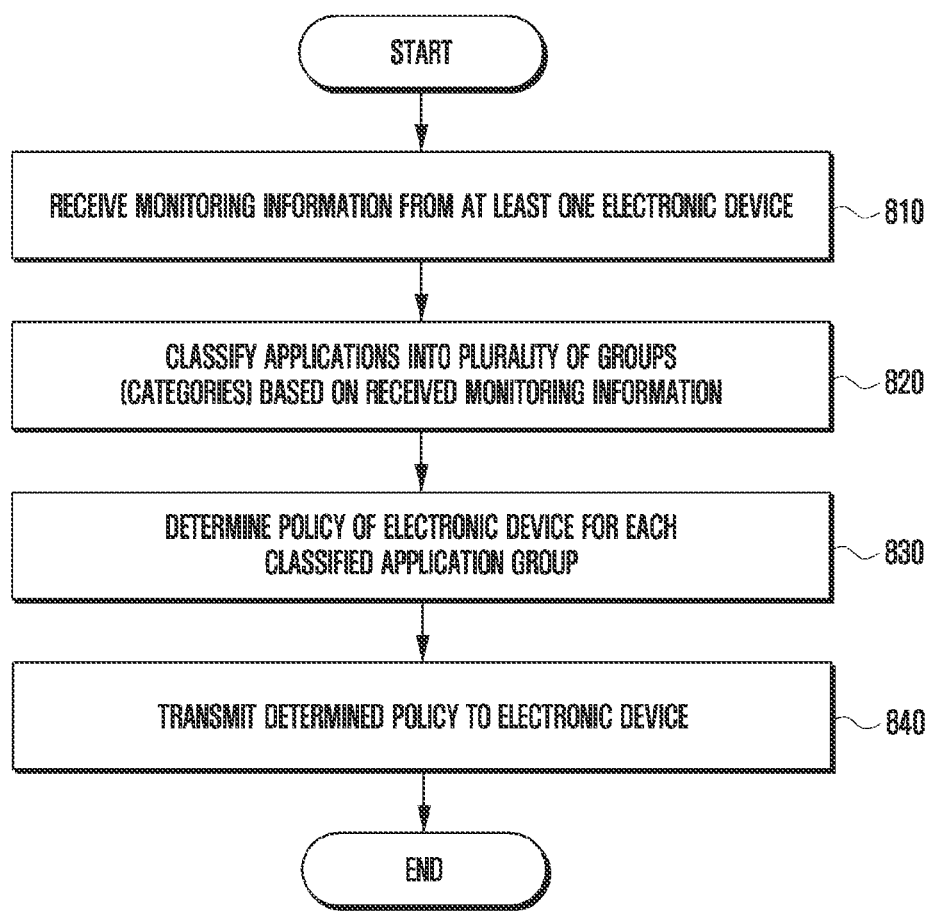
FIG. 8 is a flow chart illustrating a method for supporting control of current and/or heat generation of an electronic device in an external electronic device according to an embodiment.

FIG. 8 is a flow chart illustrating a method for supporting control of current and/or heat generation of an electronic device in an external electronic device according to an embodiment. For example, the method of FIG. 8 will be described below as being performed by components of FIG. 1.

Referring to FIG. 8, in step 810, the server 108 receives monitoring information from the electronic device 101. The monitoring information may include at least one of a network access frequency, a network access period, the amount of transmitted/received data, a temperature value of the electronic device 101, and/or an operating state of an application in accordance with the execution of the application inside the electronic device 101.

In step 820, based on the received monitoring information of the electronic device 101, the server 108 classifies (or groups) applications into a plurality of groups (categories).

In step 830, the server 108 determines a policy of the electronic device 101 for each classified application group. For example, when an application (or service) is included in an application group that requires a large amount of data transfer, the policy may be determined based on a policy configured for each application group. The policy may be determined for receiving data within a short time and minimizing energy consumption of the electronic device by increasing a CPU clock frequency of a first processor to the maximum and/or increasing a CPU clock frequency of a second processor to the maximum at an acceptable level of heat generation in the electronic device 101 and/or by allocating the 5G NR rather than the existing LTE to a network (e.g., communication scheme). If an application (or service) intermittently requires data transmission, the policy may be determined to lower the CPU clock frequencies of the first and second processors to the lowest and to allocate the LTE having a slower data transfer rate than the 5G NR to the network. The policy may configure a resource importance of an application. For example, in case of an application sensitive to a transmission latency of a network or an application having a high resource importance to a network, the server 108 may determine a policy to preferentially allocate the 5G NR. Although LTE or 5G NR is exemplarily described as a network, it may be determined to further use WiFi, ultra-wide band (UWB), and/or Bluetooth™ communication.

Depending on an application category, the server 108 may determine, as the policy, performance control of a processor (e.g., an AP, a CP) of the electronic device, a network policy, and/or configuration of the electronic device 101 such as a speaker volume, a display environment (e.g., brightness, luminance, saturation), a display frame rate, and/or a battery power saving mode. In case of an application that provides a music streaming service, the server 108 may configure, as the policy, the performance of other constitutions to the lowest except for the performance related to a processor and a speaker.

In step 840, the server 108 transmits the determined policy to the electronic device 101. The determined policy may be information related to the configuration of internal components of the electronic device 101 to be applied when the electronic device 101 executes a designated application. For example, the policy may contain information related to a processor, a network type, a speaker volume, a WiFi setting, and/or a display frame rate.

After receiving information about an application to be executed by the electronic device 101 from the electronic device 101, the server 108 may transmit a policy regarding the application to be executed to the electronic device 101.

Figure 9:
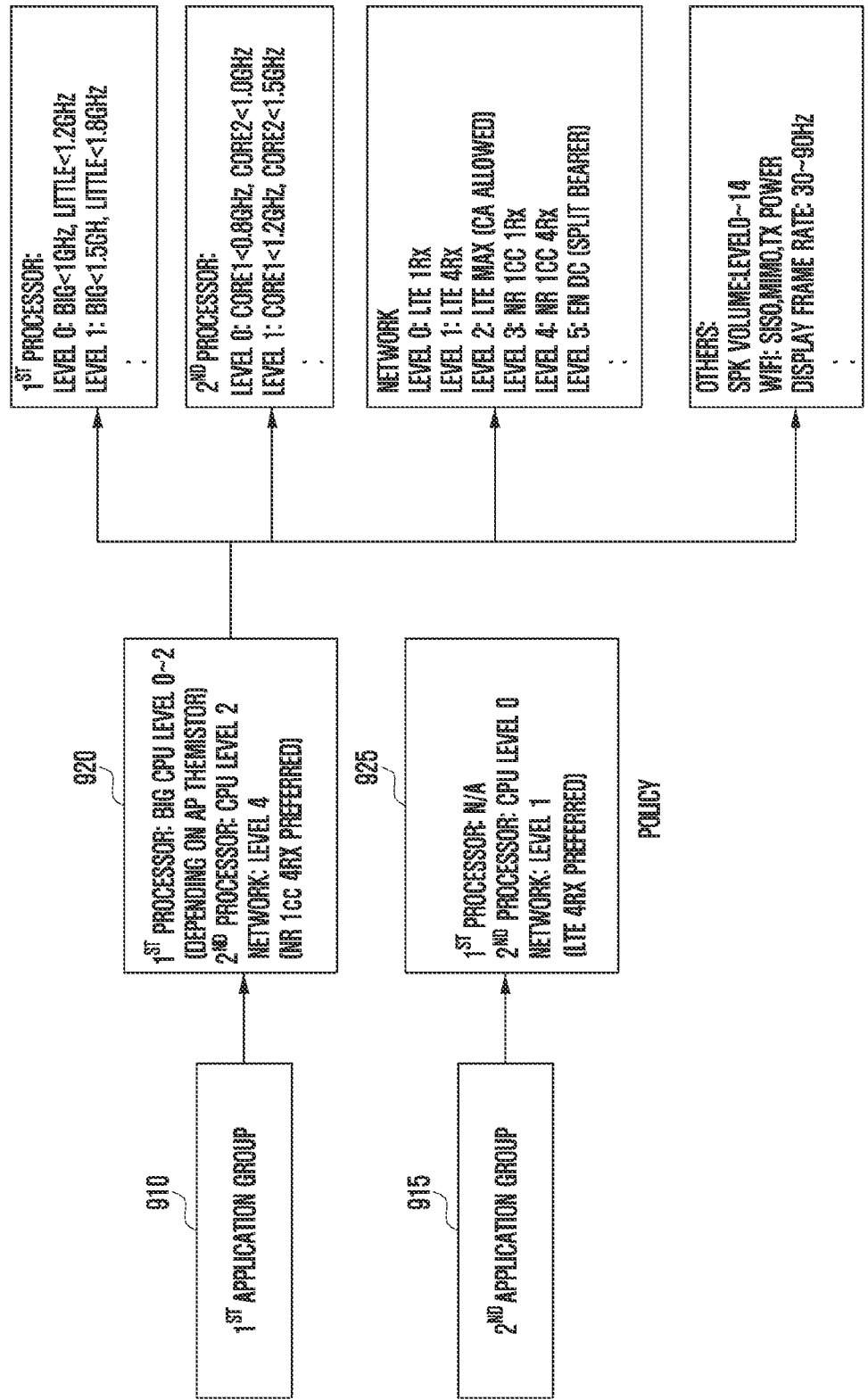
FIG. 9 illustrates a policy determined for each application according to an embodiment.

FIG. 9 illustrates a policy determined for each application according to an embodiment.

Referring to FIG. 9, applications are classified (or grouped) into a plurality of groups (e.g., two). The application groups may be determined in consideration of the frequency of accessing a network by an electronic device and/or the amount of data transfer.

A first application group 910 may include applications (or services) that require a large amount of data transfer (high throughput), and a second application group 915 may include applications (or services) that require a frequent network access while requiring a small amount of data transfer.

When an application included in the first application group 910 is executed, the electronic device may be configured to perform a first policy 920. Processors of the electronic device may be classified according to their types (e.g., a first processor and a second processor), and a level (e.g., level 0, level 1) may be defined for each processor. Depending on such levels, the CPU clock frequency, performance, and/or power consumption of the processors of the electronic device may be configured differently. For example, according to the first policy 920, the first processor (e.g., an AP) may be configured between level 0 and level 2, and the second processor (e.g., a CP) may be configured to level 2. The network may be configured to be connected to the 5G NR network at level 4 and use four frequency bands when receiving data.

When an application included in the second application group 915 is executed, the electronic device may be configured to perform a second policy 925. For example, according to the second policy 925, level setting may not be performed with respect to the first processor. The application included in the second application group 915 may have low relevance to the operation of the first processor. For example, the second processor may be configured to level 0. Because the application included in the second application group 915 may use the first processor little and frequently access the network for communication, the level of the second processor (e.g., a CP) may be configured to 0. For example, the network may be configured to level 1. The network of the electronic device may be changed in configuration to use four frequency bands in the LTE network when receiving data, so that a large amount of network resources is allocated to support fast data reception.

5G NR may include features of eMBB, URLLC, and mMTC. The eMBB can use a wider frequency bandwidth and allocate more antennas, thereby supporting the transmission of data, e.g., from 100 Mbps to up to 20 Gbps per user. Using a wide frequency bandwidth, eMBB can support a service of transmitting a large amount of data used in AR/R based on ultra-high definition (UHD), or support various services of relaying high-resolution 3 dimensional (3D) matches.

URLLC can minimize the existing latency of several tens of milliseconds (1 ms=1/1000 second) to a latency of 1 ms or less. For example, an autonomous vehicle can receive a stop signal after moving 3 m due to a latency of 100 ms when using the existing network, but can receive a stop signal after moving 3 cm with a delay of 1 ms when using the 5G network. In case of a service in which ultra-low latency communication is important, it may be important to ensure that the network is not interrupted by external factors such as temperature. mMTC can support a large number of electronic devices, industrial electronic devices, or small-scale mass electronic devices based on IoT to be interconnected and operated. For example, mMTC can support the connectivity of millions of electronic devices per a certain area (e.g., 1 km$^2$).

A policy may define respective levels for modules or components controllable by an electronic device. For example, the electronic device may configure a speaker volume, a WiFi setting, and/or a frame rate of a display for each level. In case that the level for each component of the electronic device is configured in advance, the electronic device may receive a level value and control (e.g., reduce) the amount of data transfer.

A policy may include information about a first processor of the electronic device. The information about the first processor of the electronic device may be expressed as a level. For example, if the information about the first processor of the electronic device is level 0, the clock frequency of a core (e.g., a big core) having a large load may be configured to less than 1 GHz, and the clock frequency of a core (e.g., a little core) having a small load may be configured to less than 1.2 GHz. If the clock frequency is high, data processing speed is fast, but power consumption is high, which may generate a large amount of heat.

A policy may include information about a second processor of the electronic device. The information about the second processor of the electronic device may also be expressed as a level. For example, if the information about the second processor of the electronic device is level 1, the clock frequency of core 1 may be configured to less than 1.2 GHz, and the clock frequency of core 2 may be configured to less than 1.5 GHz.

A policy may include information about a network to be used by the electronic device. The information about the network may also be expressed as a level. For example, when the information about the network is level 3, the electronic device 101 may be configured to access the 5G network and receive data using one frequency band. Information about a frequency band may also be included in the information about the network. For example, the information about the frequency band may be information about a frequency band (e.g., 3.3 to 4.2 GHz) that can be processed by an antenna module (e.g., the first antenna module 240 in FIG. 2) included in the electronic device.

A policy may include information (e.g., others) about components of electronic devices other than the processor and the network. For example, information about a speaker volume, a WiFi setting, or a frame rate of a display may be included in the policy. In addition, the policy may include information about the capacity (e.g. 10 GB (gigabyte)) or resolution (e.g., full high definition (FHD) (1920×1080), 4K UHD (3840×2160)) of an image (e.g., photo, video) reproduced using the display, and/or display driving frequency (e.g., 60 Hz or 120 Hz).

Although two application groups are described as an example in FIG. 9, there may be more application groups according to various embodiments. For example, there may be an application group that requires large-capacity data download, an application group such as a real-time online game or real-time broadcasting application that requires frequent network access with a small amount of transmitted/received data, an application group such as a video or an audio streaming application that requires periodic network access with a small amount of transmitted/received data, an application group such as a web browsing or chatting application that requires no frequent or periodic network access with a small amount of transmitted/received data, and/or an application group in which applications not included in the aforementioned application groups are included.

FIG. 10 illustrates a policy based on the execution of an application according to an embodiment.

Referring to FIG. 10, an electronic device may execute an application 1010, e.g., a real-time game application. The electronic device may monitor data used by the application 1010. The electronic device may monitor the amount of data transmitted/received through a network from the start to the end of the application 1010.

As a result of monitoring 1020, the application 1010 may transmit/receive data at a cycle of 17 msec (e.g., periodicity: periodic), the frequency of network access may be relatively frequent (e.g., access frequency: very frequent), and the average amount of transmitted/received data may be as small as 6 Kbyte/sec.

The electronic device may also monitor a temperature value of the electronic device and an operating state of the application 1010.

An application category 1030 of the application 1010 executed in the electronic device may be determined as real-time online games or applications requiring two-way communication. This classification may be performed by an external electronic device or the electronic device.

A policy 1040 based on the application category 1030 may configure the electronic device to control a first processor by itself, to prefer LTE as an access network (level 0), and to set a clock frequency of a second processor to low (level 0). According to the monitoring result 1020, the application category 1030 that requires real-time online games or two-way communication frequently accesses the network but does not have much data transmitted and received, so the policy 1040 may also be configured to lower the clock frequency of the second processor, which is a communication-related processor, and select LTE as the network.

The policy 1040 may be differently applied based on a situation (e.g., a low power situation, a time zone, location, or temperature) of the electronic device or a user's configuration. For example, when the electronic device is in a low power situation, only at least a part of the policy 1040 may be applied. If the user's configuration does not want to apply the policy 1040 or selectively applies at least a part of the policy 1040, the electronic device may apply at least a part of the policy 1040 or not apply the policy 1040. The electronic device may not apply the policy 1040 immediately, but may apply it based on a predetermined time or condition. For example, the electronic device may identify a time zone and apply the policy 1040 after a specific time has elapsed. Based on the location of the electronic device, the policy 1040 may be limited in applying or may be partially applied. For example, when the electronic device enters a specific location (e.g., a secure area, home, or office), the policy 1040 may be applied only in part or prohibited from being applied.

Applying the policy 1040 may be determined based on an application (or service) being used by the electronic device. For example, in case of using the URLLC, the electronic device may increase the priority of a policy related to the URLLC. The electronic device may raise the priority of a policy related to the URLLC among a plurality of policies received from an external electronic device and/or a plurality of policies configured in the electronic device, and control the operation of a module and/or component of the electronic device, based on the changed priority.

Figure 11:
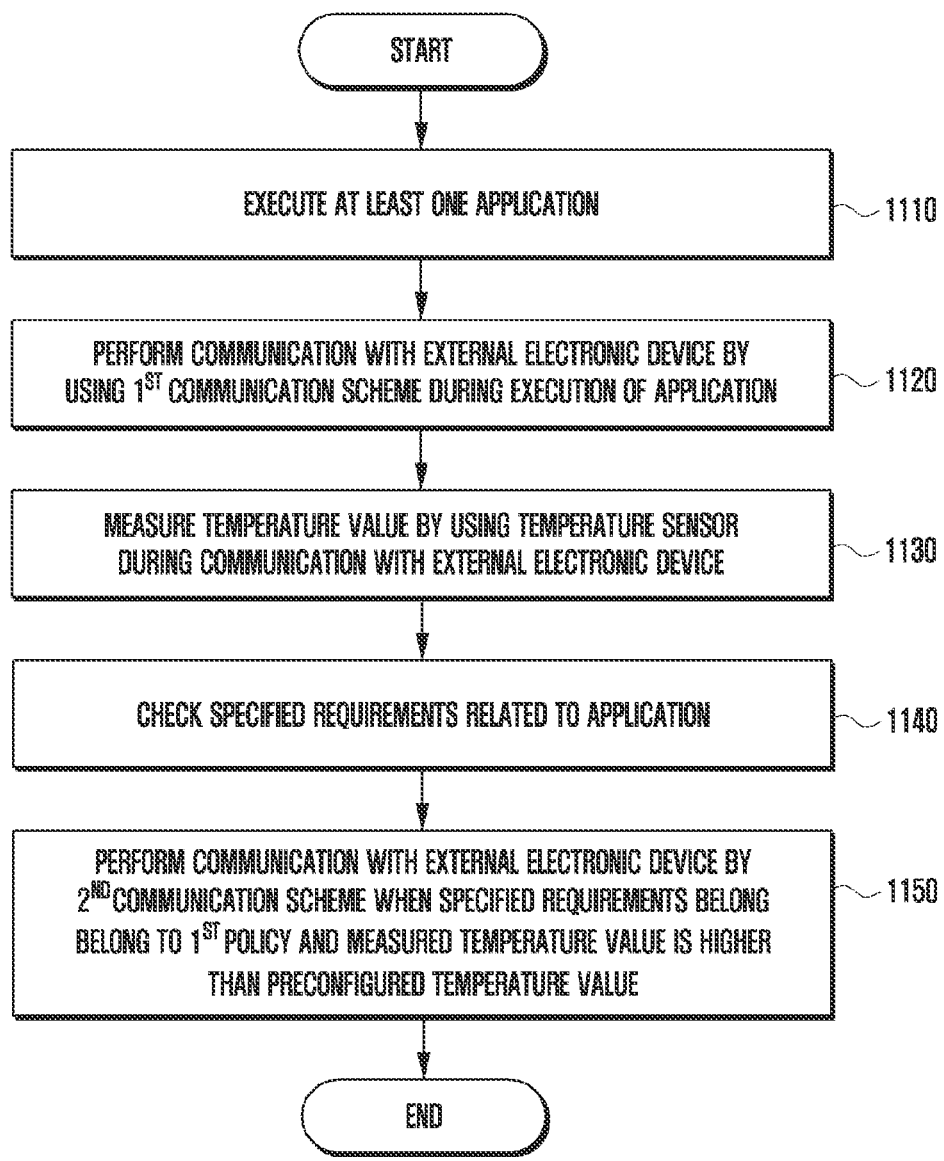
FIG. 11 is a flow chart illustrating a method for controlling power and/or heat generation based on a policy in an electronic device according to an embodiment.

FIG. 11 is a flow chart illustrating a method for controlling power and/or heat generation based on a policy in an electronic device according to an embodiment.

Referring to FIG. 11, in step 1110, a processor of the electronic device executes at least one application.

In step 1120, the processor of the electronic device performs communication with an external electronic device by using a first communication scheme while the application is executed. The first communication scheme may be 5G NR.

In step 1130, the processor of the electronic device measures a temperature value (e.g. 39 degrees) by using a temperature sensor while performing communication with the external electronic device.

In step 1140, the processor of the electronic device checks a specified requirement (e.g., a communication speed, the amount of data, a communication delay time, a network access frequency, and/or a network access period) related to an application. Applications such as energy meter reading and health/medical may have a requirement such as a relatively small amount of data transmission/reception and a low transmission speed. Applications such as autonomous vehicles and factory automation may have a requirement such as an ultra-high reliability and a low latency. Applications such as AR and 360-degree video may have a requirement such as a high speed and a broadband communication.

In step 1150, the processor of the electronic device performs communication with the external electronic device by using a second communication scheme (e.g., LTE communication) when the specified requirement belongs to a first policy (e.g., a policy supporting an ultra-high speed and a broadband communication) and when a measured temperature value is higher than a preconfigured temperature value. A communication delay time of the second communication scheme (e.g., LTE communication) may be greater than a communication delay time of the first communication scheme (e.g., 5G NR). For example, if the application is AR and if the measured temperature value (45 degrees) is higher than the preconfigured temperature value (40 degrees), the processor of the electronic device may change the communication scheme from the first communication scheme to the second communication scheme.

When the specified requirement belongs to a second policy and when the measured temperature value is higher than the preconfigured temperature value, the processor of the electronic device may adjust a data transfer rate while maintaining the first communication scheme. The processor of the electronic device may adjust a frequency band to be used for data transmission from a 3.3 to 4.2 GHz band to a 4.4 to 5.0 GHz band. Both the 3.3 to 4.2 GHz band and the 4.4 to 5.0 GHz band may be frequency bands used in the first communication scheme.

According to an embodiment of the disclosure, an electronic device may include a communication module supporting a first communication scheme and a second communication scheme, a temperature sensor, and a processor functionally connected to the communication module and the temperature sensor. The processor may be configured to execute an application by using the first communication scheme, to measure a temperature value by using the temperature sensor, to identify a policy related to the application when the measured temperature value is higher than a preconfigured temperature value, to determine whether the identified policy is capable of satisfying a QoS required by the application, and to execute the identified policy upon determining that the identified policy is capable of satisfying the QoS required by the application. The policy may include a policy using the second communication scheme.

The processor may not execute the identified policy upon determining that the identified policy fails to satisfy the QoS required by the application.

The first communication scheme may include 5G NR, and the second communication scheme may include LTE.

The QoS required by the application may include a QoS related to an amount of data transmission.

The QoS required by the application may include a QoS related to a data transfer rate using the communication module.

The temperature sensor may include a plurality of temperature sensors, and the processor may be configured to measure temperature values by using the plurality of temperature sensors, to determine a representative temperature value by using at least a part of the measured temperature values, and to identify a policy related to the application when the representative temperature value is higher than the preconfigured temperature value.

The policy related to the application may include a policy received from an external electronic device after the processor transmits the measured temperature value and information about the executed application to the external electronic device.

According to an embodiment of the disclosure, an operating method of an electronic device may include executing an application by using a first communication scheme, measuring a temperature value by using a temperature sensor, identifying a policy related to the application when the measured temperature value is higher than a preconfigured temperature value, determining whether the identified policy is capable of satisfying a QoS required by the application, and executing the identified policy upon determining that the identified policy is capable of satisfying the QoS required by the application. The policy may include a policy using the second communication scheme.

The operating method may include not executing the identified policy upon determining that the identified policy fails to satisfy the QoS required by the application. The first communication scheme may include 5G NR, and the second communication scheme may include LTE.

The QoS required by the application may include a QoS related to an amount of data transmission.

The QoS required by the application may include a QoS related to a data transfer rate using the communication module.

The temperature sensor may include a plurality of temperature sensors, and the method may further include measuring temperature values by using the plurality of temperature sensors, determining a representative temperature value by using at least a part of the measured temperature values, and identifying a policy related to the application when the representative temperature value is higher than the preconfigured temperature value.

The policy related to the application may include a policy received from an external electronic device after the measured temperature value and information about the executed application are transmitted to the external electronic device.

According to an embodiment of the disclosure, an electronic device may include a communication module supporting a first communication scheme and a second communication scheme, a temperature sensor, and a processor. The processor may be configured to execute at least one application, to perform communication with an external electronic device through the communication module by using the first communication scheme while the application is executed, to measure a temperature value of the electronic device by using the temperature sensor while the communication is performed, to identify a specified requirement related to the at least one application, and to perform communication with the external electronic device by using the second communication scheme when the specified requirement belongs to a first policy and when the temperature value of the electronic device is higher than a preconfigured temperature value. A first communication delay time of the first communication scheme may be smaller than a second communication delay time of the second communication scheme.

The processor may be further configured to, when the specified requirement belongs to a second policy and when the temperature value of the electronic device is higher than the preconfigured temperature value, adjust a data transfer rate for communication with the external electronic device in the first communication scheme, and perform the communication through the communication module by using the first communication scheme with the transfer rate adjusted.

The first communication scheme may include 5G NR, and the second communication scheme may include LTE.

The specified requirement may include information related to a communication delay time required by the application.

The specified requirement may include information related to an amount of data required by the application.

The specified requirement may include information related to a network access frequency required by the application.

The temperature sensor may include a plurality of temperature sensors, and the processor may measure temperature values by using the plurality of temperature sensors, determine a representative temperature value by using at least a part of the measured temperature values, and configure the representative temperature value as a temperature value of the electronic device.

Various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "$1^{st}$" and "$2^{nd}$" or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Additionally, the steps described in the flowcharts illustrated in FIGS. 3, 5, 8, and 11 may be performed sequentially, in parallel, iteratively, or heuristically. For example, they may be performed in another order, some operations may be omitted, or any other operation may be added.

According to the disclosure, an electronic device may differently configure an access policy including information on network resources for each classified application group. The electronic device may control power consumption and/or heat generation, based on the status of an internal component and/or module. The electronic device may negotiate with a base station to efficiently use network resources.

According to various embodiments, each component (e.g., a module or a program) of the above-described components may include a single entity or multiple entities, and some of the multiple entities may be separately disposed in different components.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
a communication module supporting a first communication scheme and a second communication scheme;
a temperature sensor; and
a processor configured to:
execute an application by using the first communication scheme,
measure a temperature value by using the temperature sensor,
identify a policy related to the executed application when the measured temperature value is higher than a preconfigured temperature value,
determine whether the identified policy satisfies a quality of service (QoS) required by the application, and
execute the identified policy upon determining that the identified policy satisfies the QoS required by the application,
wherein the policy uses the second communication scheme.

2. The electronic device of claim 1, wherein the processor is further configured to not execute the identified policy upon determining that the identified policy fails to satisfy the QoS required by the application.

3. The electronic device of claim 1, wherein the first communication scheme includes $5^{th}$ generation (5G) new radio (NR), and the second communication scheme includes long term evolution (LTE).

4. The electronic device of claim 1, wherein the QoS required by the application is related to an amount of data transmission.

5. The electronic device of claim 1, wherein the QoS required by the application is related to a data transfer rate using the communication module.

6. The electronic device of claim 1, further comprising an additional temperature sensor,
wherein the processor is configured to:
measure temperature values by using the temperature sensor and the additional temperature sensor,
determine a representative temperature value by using at least a part of the measured temperature values, and
identify a policy related to the application when the representative temperature value is higher than the preconfigured temperature value.

7. The electronic device of claim 1, wherein the policy related to the application is received from an external electronic device after the processor transmits the measured temperature value and information about the executed application to the external electronic device.

8. A method performed by an electronic device, the method comprising:
executing an application by using a first communication scheme;
measuring a temperature value by using a temperature sensor;
identifying a policy related to the executed application when the measured temperature value is higher than a preconfigured temperature value;
determining whether the identified policy satisfies a quality of service (QoS) required by the application; and
executing the identified policy upon determining that the identified policy satisfies the QoS required by the application,
wherein the policy uses a second communication scheme.

9. The method of claim 8, further comprising not executing the identified policy upon determining that the identified policy fails to satisfy the QoS required by the application.

10. The method of claim 8, wherein the first communication scheme includes $5^{th}$ generation (5G) new radio (NR), and the second communication scheme includes long term evolution (LTE).

11. The method of claim 8, wherein the QoS required by the application is related to an amount of data transmission.

12. The method of claim 8, wherein the QoS required by the application is related to a data transfer rate using the communication module.

13. The method of claim 8, further comprising
measuring temperature values by using an additional temperature sensor;
determining a representative temperature value by using at least a part of the measured temperature values by the temperature sensor and the additional temperature sensor; and
identifying a policy related to the application when the representative temperature value is higher than the preconfigured temperature value.

14. The method of claim 8, further comprising:
transmitting the measured temperature value and information about the executed application to an external electronic device; and
receiving the policy related to the application from the external electronic device.

15. An electronic device, comprising:
a communication module supporting a first communication scheme and a second communication scheme;
a temperature sensor; and
a processor configured to:
execute an application,
perform communication with an external electronic device through the communication module by using the first communication scheme while the application is executed,
measure a temperature value of the electronic device by using the temperature sensor while the communication is performed,
identify a specified requirement related to the executed application, and
perform communication with the external electronic device by using the second communication scheme when the specified requirement belongs to a first policy and when the temperature value of the electronic device is higher than a preconfigured temperature value, and
wherein a first communication delay time of the first communication scheme is smaller than a second communication delay time of the second communication scheme.

16. The electronic device of claim 15, wherein the processor is further configured to, when the specified requirement belongs to a second policy and when the temperature value of the electronic device is higher than the preconfigured temperature value, adjust a data transfer rate for communication with the external electronic device in the first communication scheme, and perform the communication through the communication module by using the first communication scheme with the transfer rate adjusted.

17. The electronic device of claim 15, wherein the first communication scheme includes $5^{th}$ generation (5G) new radio (NR), and the second communication scheme includes long term evolution (LTE).

18. The electronic device of claim 15, wherein the specified requirement includes information related to a communication delay time required by the application.

19. The electronic device of claim 15, wherein the specified requirement includes information related to an amount of data required by the application.

20. The electronic device of claim 15, wherein the specified requirement includes information related to a network access frequency required by the application.

* * * * *